(12) United States Patent
Sun et al.

(10) Patent No.: US 12,355,537 B2
(45) Date of Patent: Jul. 8, 2025

(54) FEEDBACK CODEBOOKS WITH BUNDLING

(71) Applicant: QUALCOMM Incorporated, San Diego, CA (US)

(72) Inventors: Jing Sun, San Diego, CA (US); Jing Jiang, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 18/363,386

(22) Filed: Aug. 1, 2023

(65) Prior Publication Data

US 2025/0047353 A1 Feb. 6, 2025

(51) Int. Cl.
*H04B 7/06* (2006.01)
*H04W 72/23* (2023.01)

(52) U.S. Cl.
CPC .......... *H04B 7/0639* (2013.01); *H04W 72/23* (2023.01)

(58) Field of Classification Search
CPC .... H04B 7/0639; H04W 72/23; H04L 1/1685; H04L 1/1614; H04L 1/1671; H04L 1/1825; H04L 1/1864; H04L 1/1896
See application file for complete search history.

(56) References Cited

U.S. PATENT DOCUMENTS

| | | | | |
|---|---|---|---|---|
| 2021/0351876 A1* | 11/2021 | Huang | ............... | H04L 1/1861 |
| 2022/0116158 A1* | 4/2022 | Park | ............... | H04L 1/1896 |
| 2022/0272569 A1* | 8/2022 | Berliner | ............... | H04L 1/1896 |
| 2022/0330311 A1 | 10/2022 | Zewail et al. | | |
| 2023/0371039 A1* | 11/2023 | Tsai | ............... | H04W 72/232 |
| 2023/0388056 A1* | 11/2023 | Eriksson | ............... | H04L 1/1671 |
| 2024/0178898 A1* | 5/2024 | Liu | ............... | H04L 25/0254 |

FOREIGN PATENT DOCUMENTS

WO WO-2022216523 A1 10/2022

OTHER PUBLICATIONS

International Search Report and Written Opinion—PCT/US2024/036523—ISA/EPO—Oct. 10, 2024.

* cited by examiner

*Primary Examiner* — Jean B Corrielus
(74) *Attorney, Agent, or Firm* — Holland & Hart LLP

(57) ABSTRACT

Methods, systems, and devices for wireless communications are described. A user equipment (UE) may be configured with a bundling factor, may first generate a codebook, and may then bundle a quantity of bits into a single bit according to the bundling factor (e.g., may compress the sequence of bits into a smaller, second set of bits, where each bit of the second set of bits represents a quantity of the sequence of bits equal to the bundling factor). The UE may support cross downlink control information (DCI) bundling, in which case each bundle of the sequence of bits may be based on the bundling factor, instead of being based on the DCI (e.g., a given bundle may include feedback bits corresponding to occasions of multiple grants).

30 Claims, 15 Drawing Sheets

FEEDBACK CODEBOOKS WITH BUNDLING

FIELD OF TECHNOLOGY

The following relates to wireless communications, including feedback codebooks with bundling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support feedback codebooks with bundling. For example, the described techniques support a user equipment (UE) that is configured with a bundling factor (e.g., a quantity of bits to be included in each bundle). The UE may first generate a codebook (e.g., a sequence of feedback bits for multiple physical downlink shared channel (PDSCH) occasions, which may correspond to one or multiple downlink control information (DCI) messages), and may then bundle the quantity of bits into a single bit according to the bundling factor (e.g., may compress the sequence of bits into a smaller, second set of bits, where each bit of the second set of bits represents a quantity of the sequence of bits equal to the bundling factor). The UE may support cross DCI bundling, in which case each bundle of the sequence of bits may be based on the bundling factor, instead of being based on the DCI (e.g., a given bundle may include feedback bits corresponding to PDSCH occasions of multiple grants).

In some cases, the UE may include an additional bit in the feedback message indicating whether the entire codebook includes one or more feedback errors (e.g., indicating if any negative acknowledgement (NACK) bits of the bundled feedback information correspond to an unbundled set of feedback bits, at least one of which is an acknowledgement (ACK) bit). In response, the network may trigger a retransmission of the whole unbundled bit sequence. In some examples, the UE may include an additional bit in the feedback message for each bundle indicating whether the bundle corresponds to a feedback error (e.g., indicating whether a NACK bit for the bundle corresponds to at least one ACK bit). In response, the network may trigger a retransmission of a subset of the initial bit sequence. In some examples, the UE may report whether a quantity of feedback errors satisfies a threshold, and the network may request transmission based thereon. The network may configure the threshold at the UE.

A method for wireless communications by a user equipment (UE) is described. The method may include receiving control signaling enabling feedback codebook bundling and indicating a bundling value, generating a codebook including a first set of bits corresponding to a set of multiple downlink shared channel occasions, bundling the first set of bits into a second set of bits, each bit of the second set of bits corresponding to a respective subset of the first set of bits, where a quantity of bits of each subset of the first set of bits is based on the bundling value, and transmitting a feedback message including the codebook including the second set of bits.

A UE for wireless communications is described. The UE may include one or more memories storing processor executable code, and one or more processors coupled with the one or more memories. The one or more processors may individually or collectively operable to execute the code to cause the UE to receive control signaling enabling feedback codebook bundling and indicating a bundling value, generate a codebook including a first set of bits corresponding to a set of multiple downlink shared channel occasions, bundle the first set of bits into a second set of bits, each bit of the second set of bits corresponding to a respective subset of the first set of bits, where a quantity of bits of each subset of the first set of bits is based on the bundling value, and transmit a feedback message including the codebook including the second set of bits.

Another UE for wireless communications is described. The UE may include means for receiving control signaling enabling feedback codebook bundling and indicating a bundling value, means for generating a codebook including a first set of bits corresponding to a set of multiple downlink shared channel occasions, means for bundling the first set of bits into a second set of bits, each bit of the second set of bits corresponding to a respective subset of the first set of bits, where a quantity of bits of each subset of the first set of bits is based on the bundling value, and means for transmitting a feedback message including the codebook including the second set of bits.

A non-transitory computer-readable medium storing code for wireless communications is described. The code may include instructions executable by a processor to receive control signaling enabling feedback codebook bundling and indicating a bundling value, generate a codebook including a first set of bits corresponding to a set of multiple downlink shared channel occasions, bundle the first set of bits into a second set of bits, each bit of the second set of bits corresponding to a respective subset of the first set of bits, where a quantity of bits of each subset of the first set of bits is based on the bundling value, and transmit a feedback message including the codebook including the second set of bits.

Some examples of the method, user equipment (UEs), and non-transitory computer-readable medium described herein may further include operations, features, means, or instructions for receiving a first downlink control information message indicating a first portion of the set of multiple downlink shared channel occasions and receiving a second downlink control information message indicating a second portion of the set of multiple downlink shared channel occasions, where at least one subset of the first set of bits corresponds to one or more downlink shared channel occasions of the first portion of the set of multiple downlink shared channel occasions and one or more downlink shared channel occasions of the second portion of the set of multiple downlink shared channel occasions.

Some examples of the method, user equipment (UEs), and non-transitory computer-readable medium described herein may further include operations, features, means, or instructions for monitoring for downlink signaling via the set of multiple downlink shared channel occasions and setting a first bit of the second set of bits to indicate an acknowledgement message based on receiving the downlink signaling via each downlink shared channel occasion corresponding to a first subset of the set of multiple downlink shared channel occasions and a respective first subset of the first set of bits.

Some examples of the method, user equipment (UEs), and non-transitory computer-readable medium described herein may further include operations, features, means, or instructions for monitoring for downlink signaling via the set of multiple downlink shared channel occasions and setting a first bit of the second set of bits to indicate a negative acknowledgement message based on failing to receive the downlink signaling via one or more downlink shared channel occasions corresponding to a subset of the set of multiple downlink shared channel occasions and a respective first subset of the first set of bits.

Some examples of the method, user equipment (UEs), and non-transitory computer-readable medium described herein may further include operations, features, means, or instructions for transmitting, via the feedback message, a bit indicating that at least one bit of the second set of bits indicates a negative acknowledgement message for a first subset of the first set of bits, where at least one of the first subset of the first set of bits indicates an acknowledgement message for at least one respective downlink shared channel occasion.

Some examples of the method, user equipment (UEs), and non-transitory computer-readable medium described herein may further include operations, features, means, or instructions for receiving control signaling triggering retransmission of the first set of bits based on the bit indicating the at least one feedback error.

Some examples of the method, user equipment (UEs), and non-transitory computer-readable medium described herein may further include operations, features, means, or instructions for transmitting, via the feedback message, a third set of bits, each bit of the third set of bits indicating whether a respective bit of the second set of bits corresponds to a feedback error, the feedback error indicating that the respective bit of the second set of bits indicates a negative acknowledgement message for a first subset of the first set of bits, where at least one bit of the first subset of the first set of bits indicates an acknowledgement message for at least one downlink shared channel occasion.

Some examples of the method, user equipment (UEs), and non-transitory computer-readable medium described herein may further include operations, features, means, or instructions for receiving control signaling triggering retransmission of at least the first subset of the first set of bits based on the third set of bits indicating that a respective bit of the second set of bits corresponds to the feedback error.

Some examples of the method, user equipment (UEs), and non-transitory computer-readable medium described herein may further include operations, features, means, or instructions for transmitting, via the feedback message, an indication that a quantity of feedback errors in the second set of bits satisfies a threshold, where each feedback error of the quantity of feedback errors indicates that at least one bit of the second set of bits indicates a negative acknowledgement message for a first subset of the first set of bits, where one of the first subset of the first set of bits indicates an acknowledgement message for a respective downlink shared channel occasion.

Some examples of the method, user equipment (UEs), and non-transitory computer-readable medium described herein may further include operations, features, means, or instructions for receiving control signaling indicating the threshold, where transmitting the indication that the quantity of feedback errors satisfies the threshold may be based on receiving the control signaling indicating the threshold.

A method for wireless communications by a network entity is described. The method may include transmitting control signaling enabling feedback codebook bundling and indicating a bundling value, receiving a feedback message based on transmitting the control signaling, where a first set of bits of a codebook corresponding to a set of multiple downlink shared channel occasions is bundled into a second set of bits, each bit of the second set of bits corresponding to a respective subset of the first set of bits, where a quantity of bits of each subset of the first set of bits is based on the bundling value, and decoding the feedback message according to the codebook and based on the bundling value.

A network entity for wireless communications is described. The network entity may include one or more memories storing processor executable code, and one or more processors coupled with the one or more memories. The one or more processors may individually or collectively operable to execute the code to cause the network entity to transmit control signaling enabling feedback codebook bundling and indicating a bundling value, receive a feedback message based on transmitting the control signaling, where a first set of bits of a codebook corresponding to a set of multiple downlink shared channel occasions is bundled into a second set of bits, each bit of the second set of bits corresponding to a respective subset of the first set of bits, where a quantity of bits of each subset of the first set of bits is based on the bundling value, and decode the feedback message according to the codebook and based on the bundling value.

Another network entity for wireless communications is described. The network entity may include means for transmitting control signaling enabling feedback codebook bundling and indicating a bundling value, means for receiving a feedback message based on transmitting the control signaling, where a first set of bits of a codebook corresponding to a set of multiple downlink shared channel occasions is bundled into a second set of bits, each bit of the second set of bits corresponding to a respective subset of the first set of bits, where a quantity of bits of each subset of the first set of bits is based on the bundling value, and means for decoding the feedback message according to the codebook and based on the bundling value.

A non-transitory computer-readable medium storing code for wireless communications is described. The code may include instructions executable by a processor to transmit control signaling enabling feedback codebook bundling and indicating a bundling value, receive a feedback message based on transmitting the control signaling, where a first set of bits of a codebook corresponding to a set of multiple downlink shared channel occasions is bundled into a second set of bits, each bit of the second set of bits corresponding to a respective subset of the first set of bits, where a quantity of bits of each subset of the first set of bits is based on the bundling value, and decode the feedback message according to the codebook and based on the bundling value.

Some examples of the method, network entities, and non-transitory computer-readable medium described herein may further include operations, features, means, or instructions for transmitting a first downlink control information message indicating a first portion of the set of multiple downlink shared channel occasions and transmitting a second downlink control information message indicating a second portion of the set of multiple downlink shared channel occasions, where at least one subset of the first set of bits corresponds to one or more downlink shared channel occasions of the first portion of the set of multiple downlink shared channel occasions and one or more downlink shared channel occasions of the second portion of the set of multiple downlink shared channel occasions.

Some examples of the method, network entities, and non-transitory computer-readable medium described herein may further include operations, features, means, or instructions for transmitting downlink signaling via the set of multiple downlink shared channel occasions, where a first bit of the second set of bits in the feedback message indicates an acknowledgement message corresponding to the downlink signaling via each downlink shared channel occasion corresponding to a first subset of the set of multiple downlink shared channel occasions and a respective first subset of the first set of bits.

Some examples of the method, network entities, and non-transitory computer-readable medium described herein may further include operations, features, means, or instructions for transmitting downlink signaling via the set of multiple downlink shared channel occasions, where a first bit of the second set of bits to indicates a negative acknowledgement message corresponding to a subset of the set of multiple downlink shared channel occasions and a respective first subset of the first set of bits.

Some examples of the method, network entities, and non-transitory computer-readable medium described herein may further include operations, features, means, or instructions for receiving, via the feedback message, a bit indicating that at least one bit of the second set of bits indicates a negative acknowledgement message for a first subset of the first set of bits, where at least one of the first subset of the first set of bits indicates an acknowledgement message for at least one respective downlink shared channel occasion.

Some examples of the method, network entities, and non-transitory computer-readable medium described herein may further include operations, features, means, or instructions for transmitting control signaling triggering retransmission of the first set of bits based on the bit indicating the at least one feedback error and receiving a second feedback message including the first set of bits based on transmitting the control signaling.

Some examples of the method, network entities, and non-transitory computer-readable medium described herein may further include operations, features, means, or instructions for receiving, via the feedback message, a third set of bits, each bit of the third set of bits indicating whether a respective bit of the second set of bits corresponds to a feedback error, the feedback error indicating that the respective bit of the second set of bits indicates a negative acknowledgement message for a first subset of the first set of bits, where at least one bit of the first subset of the first set of bits indicates an acknowledgement message for at least one downlink shared channel occasion.

Some examples of the method, network entities, and non-transitory computer-readable medium described herein may further include operations, features, means, or instructions for transmitting control signaling triggering retransmission of at least the first subset of the first set of bits based on the third set of bits indicating that a respective bit of the second set of bits corresponds to the feedback error and receiving a second feedback message including at least the first subset of the first set of bits based on transmitting the control signaling.

Some examples of the method, network entities, and non-transitory computer-readable medium described herein may further include operations, features, means, or instructions for receiving, via the feedback message, an indication that a quantity of feedback errors in the second set of bits satisfies a threshold, where each feedback error of the quantity of feedback errors indicates that at least one bit of the second set of bits indicates a negative acknowledgement message for a first subset of the first set of bits, where one of the first subset of the first set of bits indicates an acknowledgement message for a respective downlink shared channel occasion.

Some examples of the method, network entities, and non-transitory computer-readable medium described herein may further include operations, features, means, or instructions for transmitting control signaling indicating the threshold, where receiving the indication that the quantity of feedback errors satisfies the threshold may be based on transmitting the control signaling indicating the threshold.

DETAILED DESCRIPTION

Figure 1:
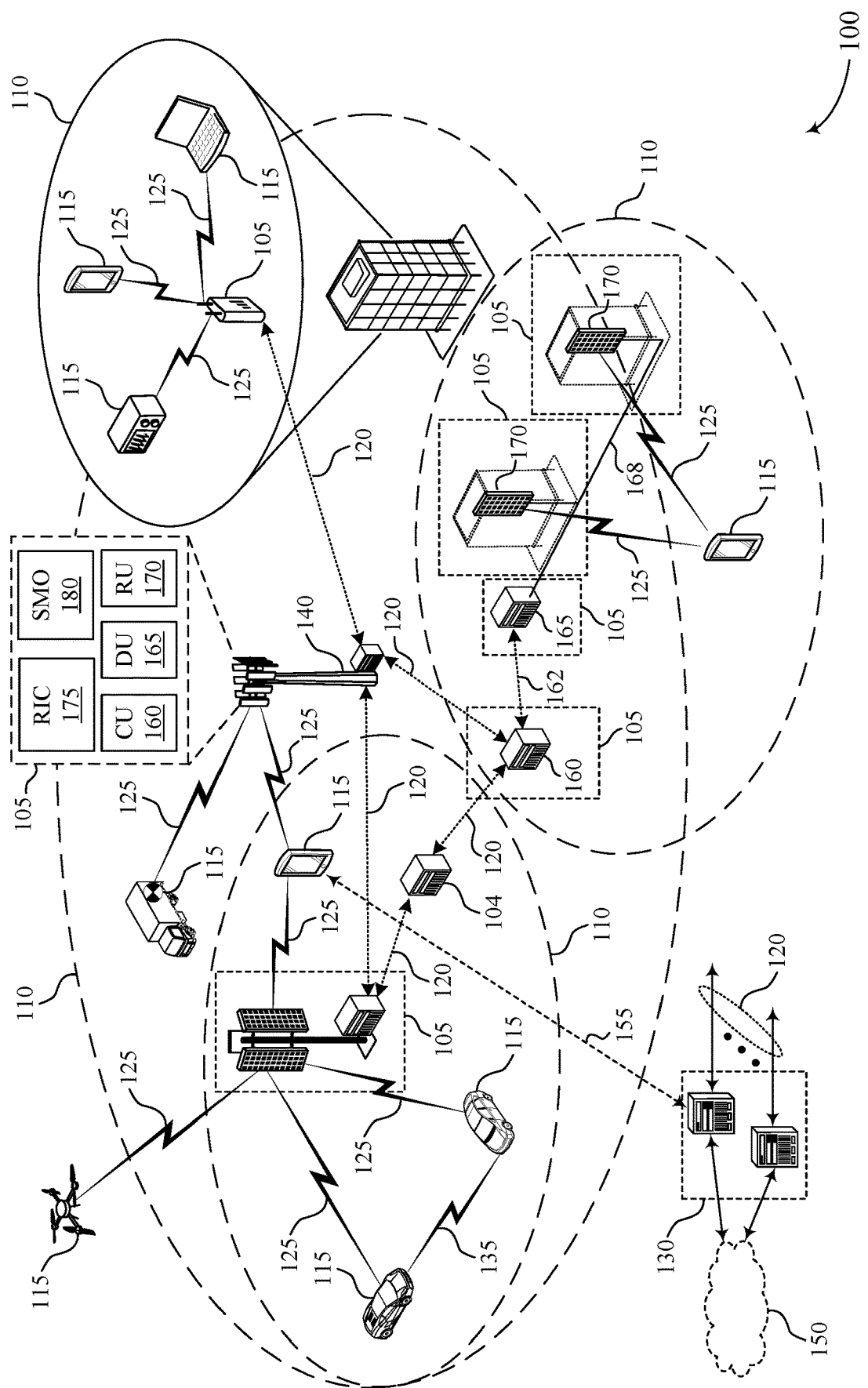
FIG. 1 shows an example of a wireless communications system that supports feedback codebooks with bundling in accordance with one or more aspects of the present disclosure.

A network entity in a wireless communications system may schedule a user equipment (UE) with one or more physical downlink shared channel (PDSCH) occasions for downlink signaling. The UE may monitor for and receive downlink signaling, and may transmit a feedback codebook (hybrid automatic repeat request (HARQ) codebook, such as a HARQ acknowledgement (ACK) negative acknowledgement (NACK) codebook) including feedback bits (e.g., indicating ACK or NACK information for the received downlink signaling). However, feedback codebooks may be large (e.g., one bit per PDSCH occasion scheduled by a given scheduling downlink control information (DCI) message), resulting in increased signaling overhead, inefficient use of resources, increased system latency, and increased power expenditure by the UE. To reduce the size of a feedback codebook, the UE may perform bundling. Bundling may refer to including a single bit in a feedback codebook for a set of feedback bits. For instance, if all of the feedback bits in a bundle are ACK bits, then a single ACK bit may be included in the codebook and transmitted (e.g., the bundle of ACK bits are bundled, or compressed, into a single ACK bit representing the bundle of bits). If any of the bundle of feedback bits are NACK bits, then a NACK bit may be included in the codebook and transmitted (e.g., the ACK bits and NACK bits may be bundled, or compressed, into a single bit representing a NACK message). Such a scenario may reduce overhead signaling, but may also reduce the quantity and quality of feedback information (e.g., is a lossy compression of information).

Further, if feedback messages (e.g., even bundled feedback messages) are configured to corresponded to DCI messages (e.g., if each feedback message corresponds to a respective grant), then even overhead signaling gains from bundling may less than if such a restriction were not present. A UE may generate feedback bits, then generate a codebook for the generated feedback bits for each respective grant (e.g., for example, three grants for three sets of PDSCH occasions results in three separate codebooks and three separate feedback messages, even if one or more of the three grants indicates small quantity of PDSCH occasions). Such inefficient feedback signaling may increase system latency due to inefficient use of available resource, decreased or lost overhead signaling gains due to bundling, increased power expenditures at the UE, and decreased user experience.

A UE may be configured with a bundling factor (e.g., a quantity of bits to be included in each bundle), and may first generate a codebook (e.g., a sequence of feedback bits for multiple PDSCH occasions, which may correspond to one or multiple DCI messages), and may then bundle the quantity of bits into a single bit according to the bundling factor (e.g., may compress the sequence of bits into a smaller, second set of bits, where each bit of the second set of bits represents a quantity of the sequence of bits equal to the bundling factor). The UE may support cross DCI bundling, in which case each bundle of the sequence of bits may include feedback associated with multiple grants of resources found in DCI messages. In such cases, the sequence of bits may be based on the bundling factor, instead of being based on the DCI (e.g., a given bundle may include feedback bits corresponding to PDSCH occasions of multiple grants).

In some cases, the UE may include an additional bit in the feedback message indicating whether the entire codebook includes one or more feedback errors (e.g., indicating if any NACK bits of the bundled feedback information corresponds to an unbundled set of feedback bits, at least one of which is an ACK bit). In response, the network may trigger a retransmission of the whole unbundled bit sequence. In some examples, the UE may include an additional bit in the feedback message for each bundle indicating whether the bundle corresponds to a feedback error (e.g., indicating whether a NACK bit for the bundle corresponds to at least one ACK bit). In response, the network may trigger a retransmission of a subset of the initial bit sequence. In some examples, the UE may report whether a quantity of feedback errors satisfies a threshold, and the network may request transmission based thereon. The network may configure the threshold at the UE.

Aspects of the disclosure are initially described in the context of wireless communications systems. Aspects of the disclosure are further illustrated by and described with reference to wireless communications systems and process flows. Aspects of the disclosure are further illustrated by and described with reference to apparatus diagrams, system diagrams, and flowcharts that relate to feedback codebooks with bundling.

FIG. 1 shows an example of a wireless communications system 100 that supports feedback codebooks with bundling in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support feedback codebooks with bundling as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may be configured with a bundling factor (e.g., a quantity of bits to be included in each bundle), and may first generate a codebook (e.g., a sequence of feedback bits for multiple PDSCH occasions, which may correspond to one or multiple DCI messages), and may then bundle the quantity of bits into a single bit according to the bundling factor (e.g., may compress the sequence of bits into a smaller, second set of bits, where each bit of the second set of bits represents a quantity of the sequence of bits equal to the bundling factor). The UE 115 may support cross DCI bundling, in which case each bundle of the sequence of bits may be based on the bundling factor, instead of based on the DCI (e.g., a given bundle may include feedback bits corresponding to PDSCH occasions of multiple grants).

In some cases, the UE 115 may include an additional bit in the feedback message indicating whether the entire codebook includes one or more feedback errors (e.g., indicating if any NACK bits of the bundled feedback information corresponds to an unbundled set of feedback bits, at least one of which is an ACK bit). In response, the network may trigger a retransmission of the whole unbundled bit sequence. In some examples, the UE may include an additional bit in the feedback message for each bundle indicating whether the bundle corresponds to a feedback error (e.g., indicating whether a NACK bit for the bundle corresponds to at least one ACK bit). In response, the network may trigger a retransmission of a subset of the initial bit sequence. In some examples, the UE may report whether a quantity of feedback errors satisfies a threshold, and the network may request transmission based thereon. The network may configure the threshold at the UE.

Figure 2:
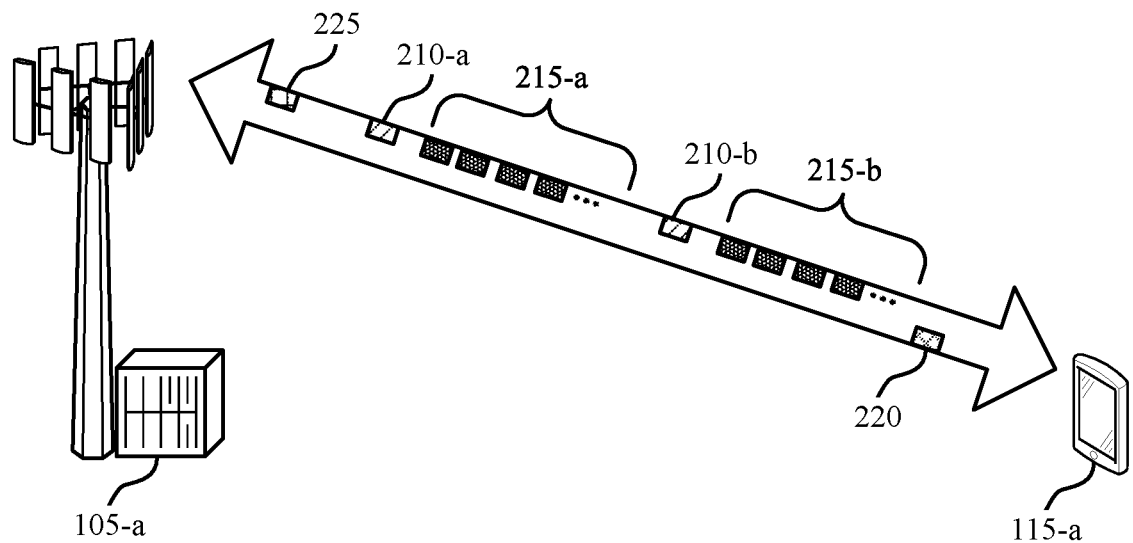
FIG. 2 shows an example of a wireless communications system that supports feedback codebooks with bundling in accordance with one or more aspects of the present disclosure.

FIG. 2 shows an example of a wireless communications system 200 that supports feedback codebooks with bundling in accordance with one or more aspects of the present disclosure. The wireless communications system 200 may implement, or be implemented by, aspects of the wireless communications system 100. For example, the wireless communications system 200 may include a network entity 105-a and a UE 115-a.

The wireless communications system 200 may support feedback mechanisms to indicate successful or unsuccessful reception of signaling. For example, the network entity may schedule downlink signaling via one or more PDSCH occasions 205. The network entity may transmit one or more control messages (e.g., DCIs 210), to schedule sets 215 of PDSCH occasions 205. The UE 115-a may monitor the scheduled PDSCH occasions 205, and may transmit a feedback message 220 indicating whether the UE 115-a successfully received downlink signaling via the scheduled PDSCH occasions 205. The feedback message 220 may include ACK or NACK indications, or both.

In some examples, the feedback signaling may be based on a codebook. In some examples, the codebook for the feedback message 220 may be a type 1 codebook. The UE 115-a may generate a type 1 codebook, in which case the feedback message my include an ACK or a NACK for each PDSCH occasion 205, resulting in robust feedback message 220 (e.g., but with a large amount of signaling overhead). In some examples, the codebook for the feedback message 220 may be a type 2 codebook. The UE 115-a may generate a type 2 codebook based on additional bits included in the DCIs 210 to avoid missed DCIs 210. The additional bits may include a counter DAI, and a total DAI (e.g., corresponding to a common PUSCH or PDSCH). The counter DAI and the total DAI may indicate an order of DCIs 210, allowing the UE 115-a to detect missed DCIs. However, such additional bits in the DCI may lead to increased signaling overhead. In some examples, the codebook for the feedback message 220 may be a type 3 codebook. In such examples, a DCI 210 may trigger a type 3 codebook feedback message 220, in which case the DCI 210 may trigger a transmission or retransmission of a full set of ACK/NACK bits (e.g., for all HARQ processes). For instance, in case of a NACK feedback message 220 or a missed feedback message 220, the network entity 105-a may trigger a type 3 codebook feedback message 220.

In some examples, the UE 115-a and the network entity 105-a may support feedback bundling (e.g., A/N bundling or HARQ feedback bundling). Feedback bundling may reduce codebook size for feedback signaling, resulting in decreased signaling overhead and more efficient use of available system resources. In some examples, the UE 115-a may bundle multiple feedback bits together, and transmit one bit only (e.g., one bit representing the bundled feedback bits). if all feedback bits to be bundled are ACK bits, then the UE 115-a may transmit a single ACK bit. Otherwise (e.g., if even one of the feedback bits to be bundled is a NACK bit), the UE 115-a may transmit a NACK bit. For instance, the DCI 210-a may schedule a set 215-a of PDSCH occasions 205 (e.g., the set 215-a may include 16 PDSCH occasions 205). The UE 115-a may bundle the 16 PDSCH occasions (e.g., may compress the 16 PDSCH occasions into a single feedback bit), and may transmit the single feedback bit (e.g., in the feedback message 220). If the UE 115-a successfully receives downlink signaling via each of the PDSCH occasions 205 of the set 215-a (e.g., if each of 16 feedback bits corresponding to the PDSCH occasions 205 of the set 215-a are ACK bits), then the UE 115-a may transmit a single ACK feedback bit for the set 215-a. However, if the UE 115-a generates even one NACK bit for the set 215-a (e.g., does not successfully receive downlink signaling scheduled via even one of the PDSCH occasions 205 of the set 215-a), then the UE 115-a may transmit a NACK bit in the feedback message 220 (e.g., which may trigger retransmission of the downlink signaling scheduled for transmission via the set 215-a of PDSCH occasions 205).

In some examples, the UE 115-a may perform spatial bundling for multi-carrier waveform (MCW) scenarios. In such examples a single DCI 210 may grant up to two spatial codewords, and the two feedback bits can be bundled by configuration. In some examples, the UE 115-a may perform time domain bundling (e.g., for multi-TTI grants). In such examples, the DCI 210 may schedule multiple PDSCHs over different time domain TTIs. One feedback bit may be generated for each transport block (TB), and the feedback bits corresponding to all TBs from one DCI 210 may be bundle to one or multiple bits by configuration. In some examples, the UE 115-a may perform multi-carrier grant cross carrier bundling. In such examples, a DCI 210 may schedule multiple PDSCHs over different carriers. One feedback bit may be generated for each TB, and the feedback bits may correspond to all TBs from one DCI 210 may be bundled to one or multiple bits by configuration.

Bundling procedures may be referred to as lossy information compression (e.g., multiple bits may be bundled or compressed into one bit). Lossy compression techniques may reduce a size of information by eliminating information, which cannot be recovered at decompression. In contrast, lossless compression results in every bit of the original information being present after decompression. For instance, in a lossy compression technique for 16 PDSCH occasions 205, the UE 115-a may generate 16 bits, each bit indicating an ACK or a NACK for a respective PDSCH occasion 205. If the UE 115-a bundles the 16 bits, then the UE 115-a may only transmit one feedback bit representing the bundle of 16 bits, such that a single feedback bit may be configured to represent feedback information for all 16 PDSCH occasions 205. In such instances, a NACK for even one PDSCH occasion of the 16 PDSCH occasions may result in the compressed feedback bit being a NACK. Thus, a granularity of information is lost, but signaling overhead is also decreased, resulting in decreased system latency, and more efficient use of resources, among other examples. In some examples, the network entity 105-a and the UE 115-a may perform one or more techniques to recover some of the lost information. For example, codebook size may be decreased based on bundling, followed by a type 3 codebook trigger (e.g., if the UE transmits a bundled feedback message including a single NACK bit) for the set 215-a of PDSCH occasions 205, then network entity 105-a may trigger a type 3 codebook feedback message 220 including the entire 16 bits for each individual PDSCH occasion 205 of the set 215-a (e.g., all uncompressed ACK or NACK bits may be reported).

In some examples, bundling may be performed on a per DCI basis (e.g., all bundles are for ACK or NACK bits corresponding to a same DCI 210). For instance, the DCI 210-a may correspond to a small quantity of PDSCH occasions 205 (e.g., 4 PDSCH occasions 205), and the DCI 210-b may correspond to a larger quantity of PDSCH occasions 205 (e.g., 20 PDSCH occasions 205). The UE 115-a may bundle the feedback bits corresponding to the set 215-a of PDSCH occasions 205, and may separately bundle the feedback bits of the set 215-b of PDSCH occasions 205 (e.g., resulting in at least two bundles). Such DCI-based bundling may not be efficient. For example, a bundle of 20 bits corresponding to the set 215-b of PDSCH occasions 205 may lose more information than a bundle of 4 bits corresponding to the set 215-a of PDSCH occasions 205. In some examples, if multiple DCIs 210 schedule small sets 215 (e.g., multiple sets 215 of 1, 2, or 3 PDSCH occasions 205), the UE 115-a may generate a feedback codebook for each DCI 210, resulting in multiple small bundles, each of which results in an increase in signaling overhead. More flexible or dynamic bundling (e.g., cross-DCI feedback bundling as described herein) may result in more consistent overhead savings, improved power savings, more consistent tradeoff between loss of information and robustness (e.g., techniques described support multiple bundles of the same or similar size, instead of a small bundle with little loss but more signaling overhead, or a large bundle with decreased signaling overhead and excessive information loss).

In some examples, according to techniques described herein, the UE 115-a may be configured with a bundling factor (e.g., which may be referred to as a bundling factor value, or a bundling factor B). For example, the network entity 105-a may transmit a control message 225 (e.g., higher layer signaling, such as RRC signaling) enabling bundling, indicating the bundling factor B, or both. In some examples, a first control message (e.g., a first RRC message or information element (IE)) may indicate that feedback bit bundling (e.g., ACK/NACK bundling, HARQ bundling) is enabled, and another control message (e.g., a second RRC message or IE) may indicate the bundling factor B.

The UE 115-a may generate a feedback codebook according to the bundling factor. The UE 115-a may generate a sequence of bits (e.g., a first set of bits, which may be referred to as uncompressed feedback bits). The UE 115-a may then bundle every B bits to a single bit according to one or more rules 9e.g., if all B bits of a given bundle are ACK bits, then the UE 115-a may report an ACK for the bundled bit, and if even one of the B bits of the given bundle are NACK bits, then the UE 115-a may report a NACK for the bundled bit).

Bundling according to the bundling factor may include cross-DCI bundling. For example, the DCI 210-a may schedule a set 215-a of PDSCH occasions 205 (e.g., including 15 PDSCH occasions 205), and the DCI 210-b may schedule a set 215-b of PDSCH occasions 205 (e.g., e.g., including 25 PDSCH occasions 205). For a bundling factor B=10, the UE 115-a may generate a feedback codebook B=10 (e.g., 4 compressed feedback bits for an initial set of 40 uncompressed feedback bits). As described herein (e.g., with reference to FIG. 3), the sequence of uncompressed bits (e.g., 40 uncompressed bits) may be referred to as a first set of bits, the compressed bits (e.g., 4 compressed bits for B=10) may be referred to as a second set of bits, where each bit of the second set of bits corresponds to a subset of the first set of bits (e.g., each uncompressed bit corresponds to a quantity B of the uncompressed bits). Each subset of the first set of bits may be referred to as a bundle of uncompressed bits, and each bit of the second set of bits may be referred to as a bundled bit.

For each bundle of 10 uncompressed feedback bits (e.g., each corresponding to 10 PDSCH occasions 205), the UE 115-a may set a compressed feedback bit to Ack if each of the 10 uncompressed feedback bits is an ACK bit, or NACK if any of the 10 uncompressed feedback bits is a NACK bit. The bundling may be cross-DCI bundling, where one subset of uncompressed feedback bits may correspond to PDSCH occasions 205 from different sets 215. For instance, a first subset of 10 uncompressed feedback bits may correspond to PDSCH occasions 205 in the set 215-a. A second subset of 10 uncompressed feedback bits may correspond to PDSCH occasions 205 in the set 215-a (e.g., a remaining 5 bits of the 15 total bits corresponding to the 15 PDSCH occasions 205 granted by the DCI 210-a), and PDSCH occasions in the set 215-b (e.g., a first 5 bits of the 25 total bits corresponding to the 25 PDSCH occasions 205 granted by the DCI 210-b). The UE 115-a may transmit a feedback message 220 including the generated codebook (e.g., including at least 4 compressed bits representing the 4 bundles of 10 uncompressed bits). In some examples, the UE 115-a may generate the codebook upon receiving a first DCI 210 (e.g., the DCI 210-a), or upon monitoring for downlink signaling via a first of multiple PDSCH occasions 205. In some examples, the UE 115-a may generate a type 1 codebook (e.g., including one or more padding NACKs in a bitmap), or a type 2 codebook, or a bundling-specific codebook (e.g., a type 4 codebook).

In some examples, the UE 115-a may include additional information in the feedback message 220 to address or mitigate information loss due to the bundling. The UE 115-a may successfully identify feedback errors (e.g., information loss) due to the bundling, and may indicate such feedback errors in the feedback message 220. A retransmission mechanism may be based on the indications of feedback errors. For example, the network entity 105-a may receive the feedback message 220, and may then collect unbundled feedback information based on the indication of the feedback error (e.g., may trigger a retransmission of all uncompressed feedback bits, or a subset of the uncompressed feedback bits, based on the indicated feedback error).

In some examples, an additional bit may be included in the feedback codebook to indicate if any of the bundled bits correspond to a feedback error (e.g., an ACK to NACK error). A compressed feedback bit that is a NACK bit may correspond to a feedback error if one or more of the uncompressed bits is an ACK bit. For example, for a bundle of 10 uncompressed bits, 5 bits may be ACK bits and 5 bits may be NACK bits. Because even one of the 10 uncompressed bits is a NACK bit, the compressed feedback bit may be set to indicate a NACK (e.g., according to one or more rules, which may be standardized, or may be indicated to the UE 115-a via control signaling). However, because 5 of the 10 uncompressed bits were ACK bits, the ACK feedback information was lost in the compression (e.g., a feedback error). In such examples (e.g., a feedback error corresponding to at least one bundle of the 4 bundles for 40 total uncompressed bits with a bundling factor of B=10), the codebook may include 5 bits (e.g., 4 compressed bits, one for each of the 4 bundled subsets of uncompressed bits, and 1 bit indicating a feedback error in at least one of the four bundled subsets of uncompressed bits). In response to the indication of a feedback error, the network entity 105-a may trigger another feedback message to recuperate the lost information. For instance, the network entity 105-a may trigger a retransmission of the full set of uncompressed bits (e.g., all 40 uncompressed feedback bits). In some examples, the network entity 105-a may trigger such a retransmission by triggering a type 3 codebook feedback message.

In some examples, one or more additional bits may be included in each bundle of the feedback codebook to indicate if each of the bundled bits correspond to a feedback error (e.g., an ACK to NACK error). For instance, the codebook may include two bits for each bundle. In such examples (e.g., a feedback error corresponding to at a second bundle of the 4 bundles for 40 total uncompressed bits with a bundling factor of B=10), the codebook may include 8 bits (e.g., one bit for each bundle indicating an ACK or a NACK, and one bit indicating whether the bundle corresponds to a feedback error). For instance, the second bit for the second bundle may indicate a feedback error, and the second bit of the first, third, and fourth bundles may indicate no feedback error (e.g., an ACK if all uncompressed bits of the respective bundle indicate an ACK). In response to the indication of a feedback error, the network entity 105-a may trigger another feedback message to recuperate the lost information. For instance, the network entity 105-a may trigger a retransmission of the bundle of uncompressed bits corresponding to the indicated feedback error (e.g., the second bundle of 10 uncompressed feedback bits). In some examples, the network entity 105-a may trigger such a retransmission by triggering a type 3 codebook feedback message for the specific subset of uncompressed bits. Such techniques may provide more accurate information regarding feedback errors and lost feedback information due to compression, and may result in more targeted retransmissions (e.g., a smaller second feedback message, instead of a total retransmission of all uncompressed bits). In some examples, the two bits for each bundle may define three states of a bundled feedback bit (e.g., an all ACK indication indicating that all uncompressed bits corresponding to a bundled bit are ACK bits, an all NACK indication indicating that all uncompressed bits corresponding to a bundled bit are NACK bits, or a mixed ACK and NACK indication indicating that some of the uncompressed bits corresponding to a bundled bit are ACK bits and others are NACK bits).

In some examples, the feedback codebook may include a soft ACK-to-NACK indication indicating that a threshold feedback error is satisfied. For instance, an additional bit (e.g., for the entire codebook, or for a given bundle in the codebook, or both) may indicate whether a quantity of feedback errors satisfies (e.g., exceeds) a threshold, or whether a ratio of feedback errors satisfies (e.g., exceeds) a threshold. In such examples, if there are many feedback errors, then the network entity 105-a may determine that the additional signaling of an uncompressed feedback message is merited, and may trigger a retransmission, whereas such increased signaling may not be triggered if the quantity of feedback errors does not satisfy the threshold. In some examples, the UE 115-a may determine whether to set the bit (e.g., which would trigger a retransmissions). That is, the UE 115-a may determine whether sufficient downlink signaling has been received, and may set the soft ACK-To-NACK error bit accordingly (e.g., to trigger the retransmission of downlink signaling, or not). In some examples, the UE 115-a may autonomously determine the threshold, or may autonomously determine whether to request a retransmission by setting the feedback error bit to indicate that feedback errors exceed a threshold. In some examples, the network entity 105-a may indicate the threshold to the UE 115-a (e.g., via a control message 225).

Figure 3:
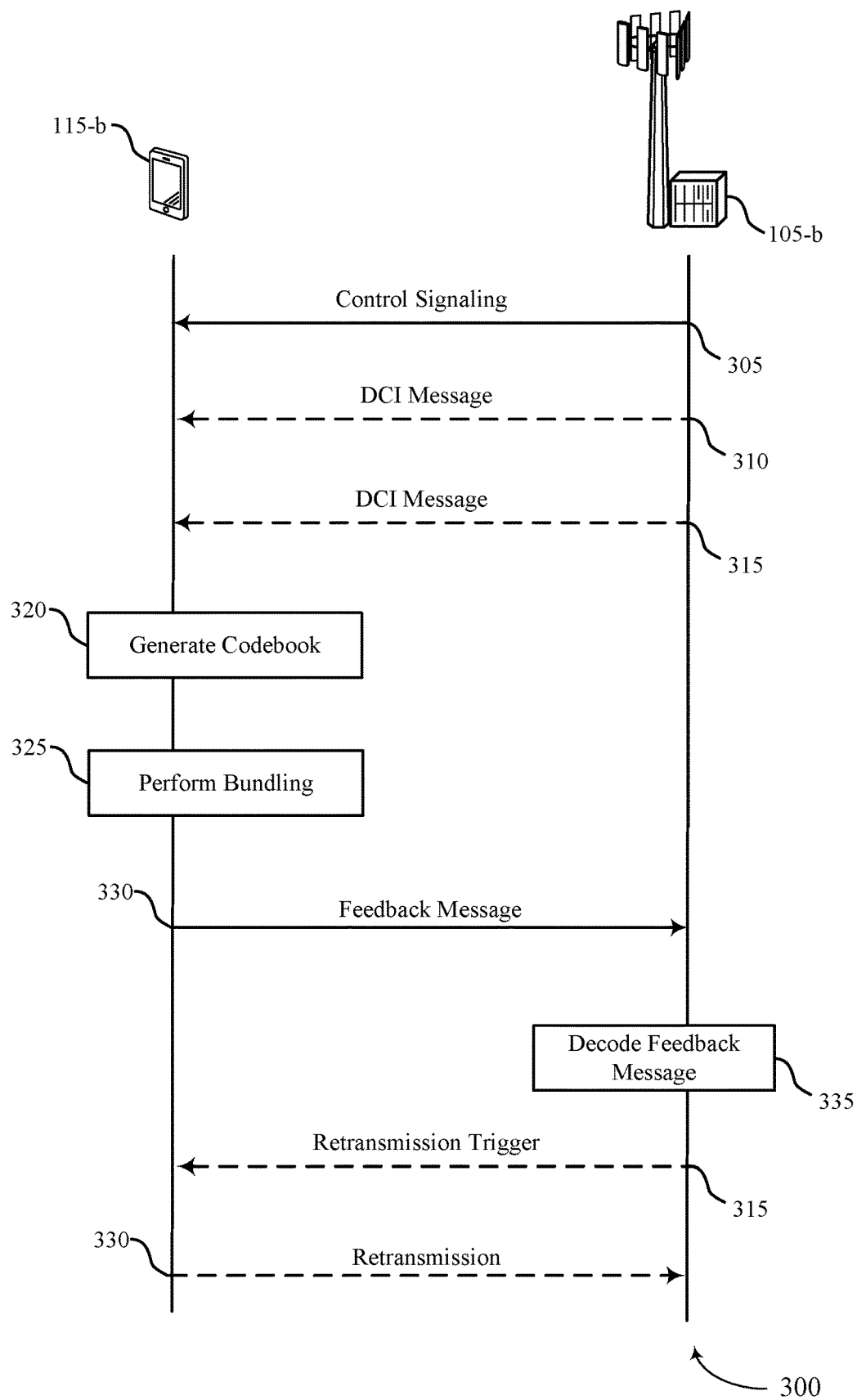
FIG. 3 shows an example of a process flow that supports feedback codebooks with bundling in accordance with one or more aspects of the present disclosure.

FIG. 3 shows an example of a process flow 300 that supports feedback codebooks with bundling in accordance with one or more aspects of the present disclosure. The process flow 300 may implement aspects of, or be implemented by aspects of, the wireless communications system 200. For example, the process flow 300 may include a UE 115-b and a network entity 105-b, which may be examples of corresponding devices described with reference to FIGS. 1-2.

At 305, the UE 115-b may receive (e.g., from the network entity 105-b) control signaling enabling feedback codebook bundling, and indicating a bundling value, as described herein.

The UE 115-b may receive (e.g., from the network entity 105-b) one or more grants (e.g., DCIs) indicating downlink shared channel occasions (e.g., PDSCH occasions). For example, at 310, the UE 115-b may receive a first DCI message indicating a first portion of the PDSCH occasions, and at 315 the UE 115-b may receive a second DCI message indicating a second portion of the PDSCH occasions.

At 320, the UE 115-b may generate a codebook, which may include a first set of bits corresponding to the downlink shared channel occasions (e.g., the PDSCH occasions scheduled by the DCI at 310, the DCI at 315, or both).

At 325, the UE 115-b may perform bundling (e.g., may compress the first set of bits into a second set of bits). For instance, the UE 115-b may bundle the first set of bits into a second set of bits, each bit of the second set of bits corresponding to a respective subset of the first set of bits (e.g., to a respective bundle). A quantity of bits of each subset of the first set of bits may be based at least in part on the bundling value (e.g., each compressed bit may map to a bundle of bits, and the quantity of bits in the bundle of uncompressed bits may be equal to the bundling factor). In some examples, at least one subset of the first set of bits (e.g., at least one bundle) may correspond to one or more PDSCH occasions of the first portion of the PDSCH occasions, and one or more PDSCH occasions of the second portion of the PDSCH occasions. In such examples, the bundling may be performed for PDSCH occasions based on the bundling factor, instead of a DCI-based bundling, such that a compressed bit may correspond to a bundle of uncompressed bits mapping to some PDSCH occasions granted in the first DCI message and some PDSCH occasions granted in the second DCI message.

In some examples, the UE 115-b may monitor for downlink signaling via the PDSCH occasions granted by the DCI messages, and may set a first bit of the second set of bits (e.g., a compressed bit) to indicate an ACK message based on receiving the downlink signaling via each PDSCH occasions corresponding to the first subset (e.g., a first bundle) of the PDSCH occasions and a respective first subset of the first set of bits. That is, the UE 115-b may set a compressed bit to indicate an ACK if each uncompressed bit is an ACK bit.

In some examples, the UE 115-b may monitor for downlink signaling via the PDSCH occasions granted by the DCI messages, and may set a first bit of the second set of bits (e.g., a compressed bit) to indicate a NACK message based at least in part on failing to receive the downlink signaling via one or more PDSCH occasions corresponding to a subset of the PDSCH occasions and a respective first subset of the first set of bits. That is, for a bundle of uncompressed bits corresponding to the subset of PDSCH occasions, the UE 115-b may set the compressed bit to NACK if even one of the uncompressed bits is a NACK (e.g., if the UE 115-b failed to receive the downlink signaling via even one of the PDSCH occasions of that particular bundle).

At 330, the UE 115-b may transmit a feedback message including the codebook that includes the second set of bits (e.g., the uncompressed bits).

At 335, the network entity 105-b may decode the feedback message according to the codebook and the bundling value.

The UE 115-b may include, in the feedback message, a bit indicating at least one feedback error corresponding to the feedback message. The feedback error may indicate that that at least one bit of the second set of bits indicates a NACK message for a first subset of the first set of bits, where at least one of the first subset of the first set of bits indicates an ACK for at least one respective downlink shared channel occasions. For example, one bit of the feedback message (e.g., an extra bit in the codebook) may indicate whether any bundle of the multiple bundles corresponds to a feedback error (e.g., a compressed NACK bit represents a set of uncompressed bits, one of which is an ACK bit). In such examples, at 315, the UE 115-b may receive control signaling (e.g., a retransmission trigger such as a grant, a triggering DCI message, among other examples) triggering retransmission of the first set of bits (e.g., the uncompressed bits) based on the bit indicating the at least one feedback error. The UE 115-b may retransmit the full set of uncompressed bits at 330 based on the retransmission trigger.

The UE 115-b may include, in the feedback message, a third set of bits, each bit of the third set of bits indicating whether a respective bit of the second set of bits corresponds to a feedback error. For example, the feedback message may include (e.g., in the codebook) an extra bit for each bundle, indicating whether the compressed bit corresponds to a feedback error (e.g., a NACK message where at least one of the uncompressed bits of the bundle is an ACK bit). In such examples, at 315, the UE 115-b may receive control signaling (e.g., a retransmission trigger such as a grant, a triggering DCI message, among other examples) triggering retransmission of any bundle for which a feedback error is indicated.

In some examples, the UE 115-b may transmit, via the feedback message, an indication that a quantity of feedback errors in the second set of bits satisfies a threshold. In some examples, the UE 115-b may receive (e.g., via control signaling, such as the control signaling at 305 or other control signaling), configuration of the threshold quantity of feedback errors, or a ratio of feedback errors. The UE 115-b may determine whether a quantity of feedback errors satisfies (e.g., exceeds) the threshold quantity of feedback errors, or whether a ratio of feedback errors (e.g., a quantity of bundles for which feedback errors occur compared to a quantity of bundles for which no feedback errors occur) satisfies the threshold, and may transmit via the feedback message (e.g., include in the codebook) an indication (e.g., a bit) indicating that the threshold is satisfied. If so, the network entity 105-b may determine whether to trigger a retransmission (e.g., at 330). For instance, if the threshold is satisfied, the network entity 105-b may determine that a significant quantity of feedback bits correspond to feedback errors, and may trigger a retransmission.

Figure 4:
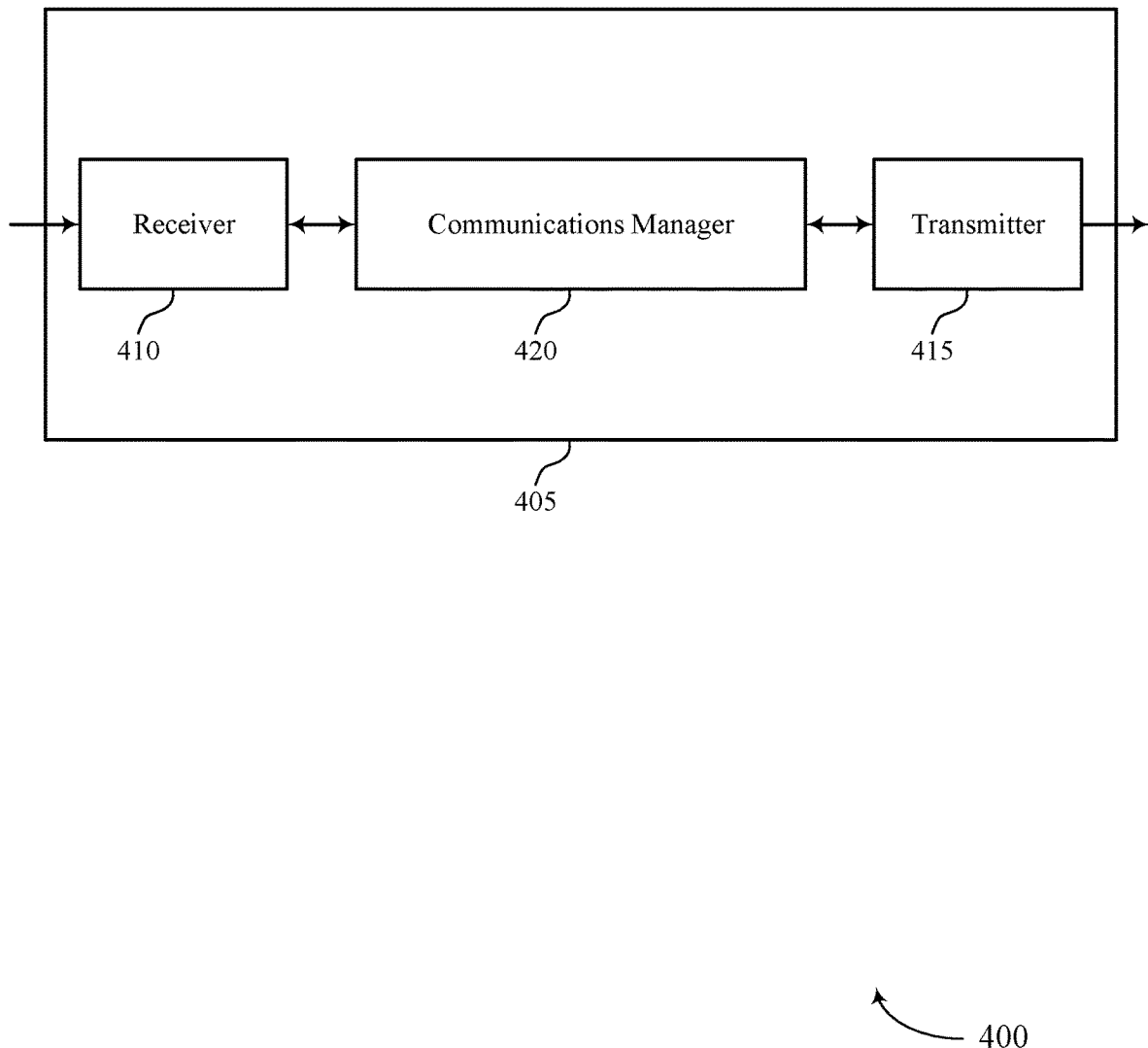
FIGS. 4 and 5 show block diagrams of devices that support feedback codebooks with bundling in accordance with one or more aspects of the present disclosure.

FIG. 4 shows a block diagram 400 of a device 405 that supports feedback codebooks with bundling in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, and the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to feedback codebooks with bundling). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to feedback codebooks with bundling). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of feedback codebooks with bundling as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor. If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for receiving control signaling enabling feedback codebook bundling and indicating a bundling value. The communications manager 420 is capable of, configured to, or operable to support a means for generating a codebook including a first set of bits corresponding to a set of multiple downlink shared channel occasions. The communications manager 420 is capable of, configured to, or operable to support a means for bundling the first set of bits into a second set of bits, each bit of the second set of bits corresponding to a respective subset of the first set of bits, where a quantity of bits of each subset of the first set of bits is based on the bundling value. The communications manager 420 is capable of, configured to, or operable to support a means for transmitting a feedback message including the codebook including the second set of bits.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for feedback codebook bundling resulting in decreased signaling overhead, more efficient use of system resources, decreased system latency, decreased power expenditure by the UE, and improved user experience.

Figure 5:
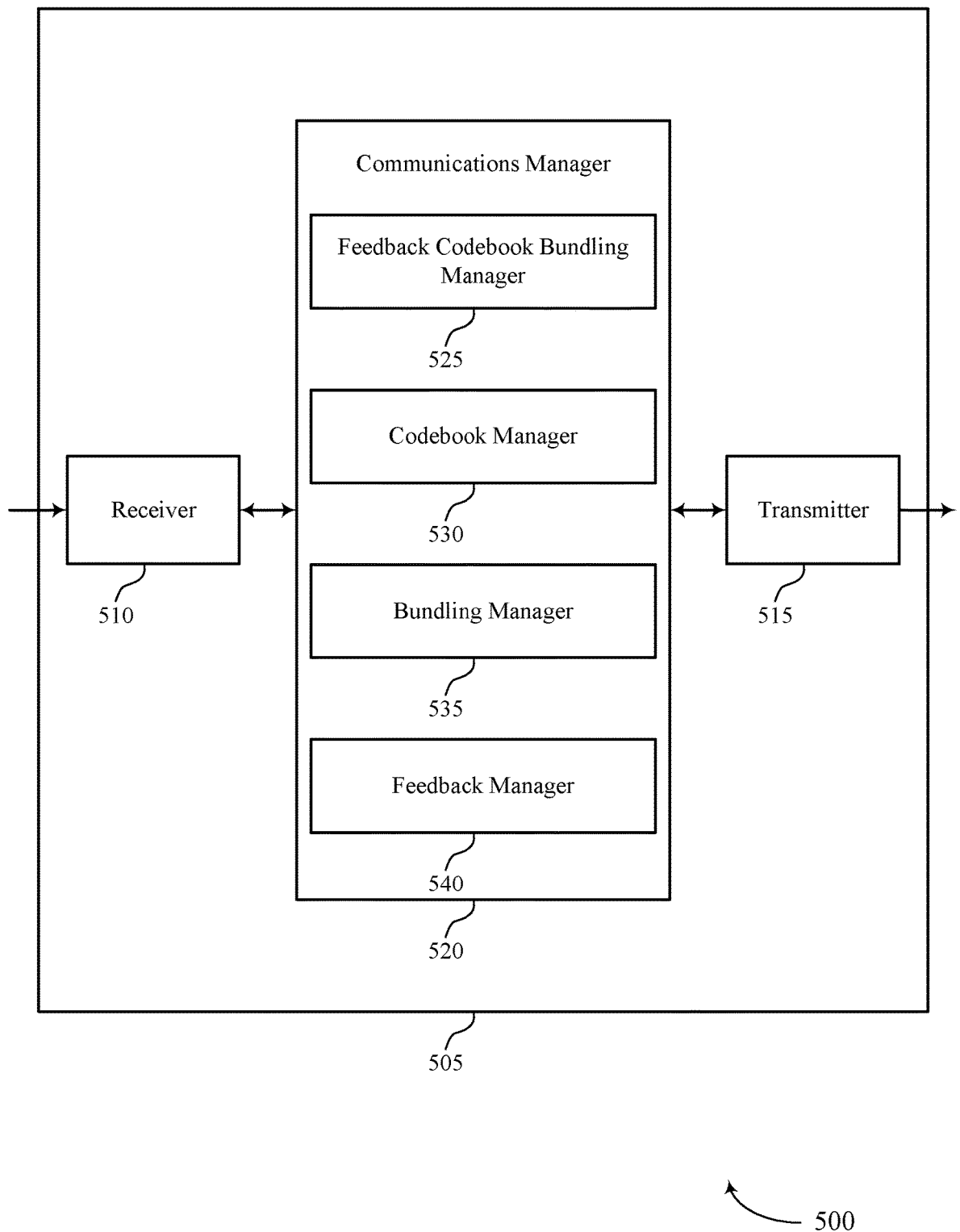

FIG. 5 shows a block diagram 500 of a device 505 that supports feedback codebooks with bundling in accordance with one or more aspects of the present disclosure. The device 505 may be an example of aspects of a device 405 or a UE 115 as described herein. The device 505 may include a receiver 510, a transmitter 515, and a communications manager 520. The device 505, or one of more components of the device 505 (e.g., the receiver 510, the transmitter 515, and the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to feedback codebooks with bundling). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to feedback codebooks with bundling). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of feedback codebooks with bundling as described herein. For example, the communications manager 520 may include a feedback codebook bundling manager 525, a codebook manager 530, a bundling manager 535, a feedback manager 540, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The feedback codebook bundling manager 525 is capable of, configured to, or operable to support a means for receiving control signaling enabling feedback codebook bundling and indicating a bundling value. The codebook manager 530 is capable of, configured to, or operable to support a means for generating a codebook including a first set of bits corresponding to a set of multiple downlink shared channel occasions. The bundling manager 535 is capable of, configured to, or operable to support a means for bundling the first set of bits into a second set of bits, each bit of the second set of bits corresponding to a respective subset of the first set of bits, where a quantity of bits of each subset of the first set of bits is based on the bundling value. The feedback manager 540 is capable of, configured to, or operable to support a means for transmitting a feedback message including the codebook including the second set of bits.

Figure 6:
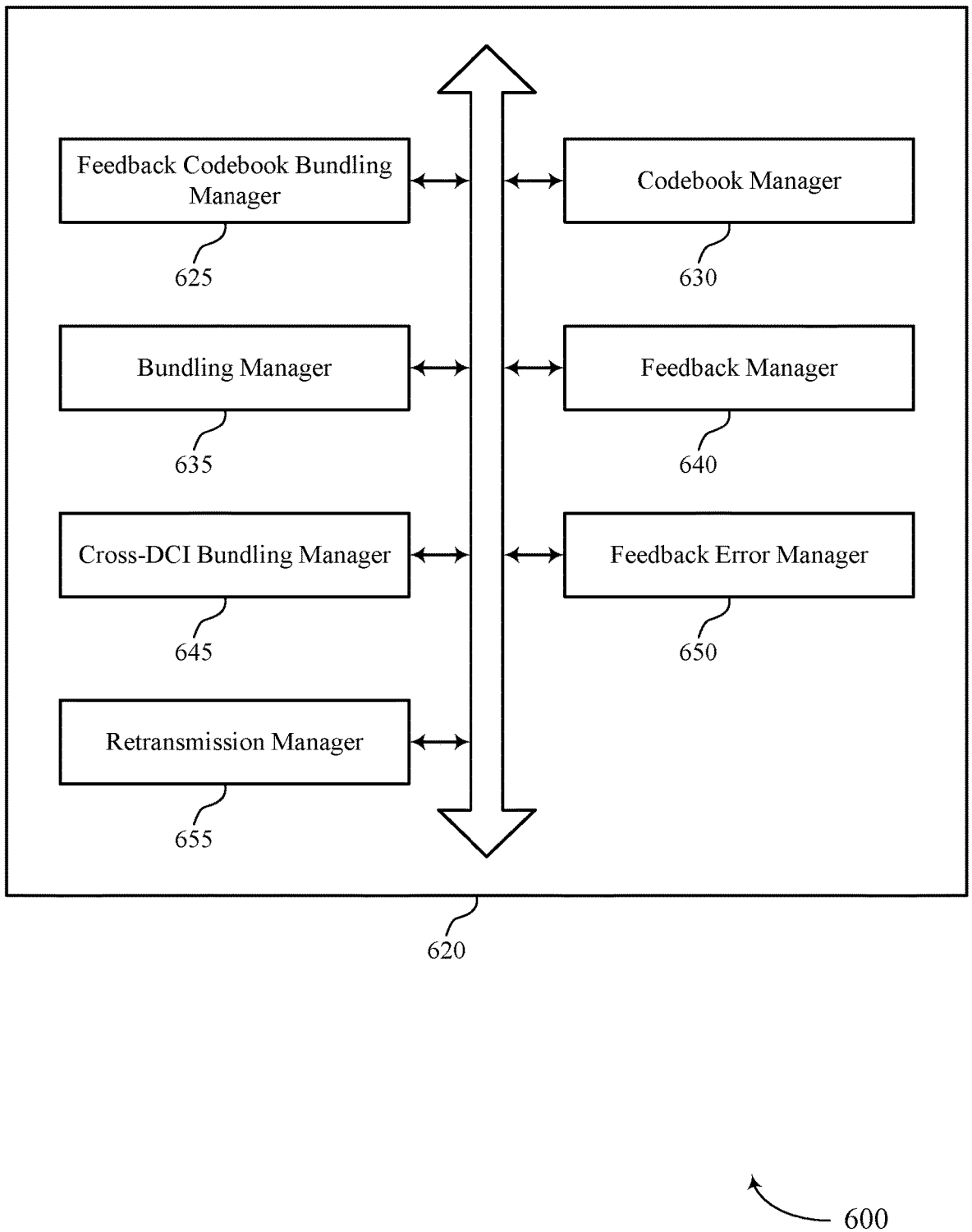
FIG. 6 shows a block diagram of a communications manager that supports feedback codebooks with bundling in accordance with one or more aspects of the present disclosure.

FIG. 6 shows a block diagram 600 of a communications manager 620 that supports feedback codebooks with bundling in accordance with one or more aspects of the present disclosure. The communications manager 620 may be an example of aspects of a communications manager 420, a communications manager 520, or both, as described herein. The communications manager 620, or various components thereof, may be an example of means for performing various aspects of feedback codebooks with bundling as described herein. For example, the communications manager 620 may include a feedback codebook bundling manager 625, a codebook manager 630, a bundling manager 635, a feedback manager 640, a cross-DCI bundling manager 645, a feedback error manager 650, a retransmission manager 655, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The feedback codebook bundling manager 625 is capable of, configured to, or operable to support a means for receiving control signaling enabling feedback codebook bundling and indicating a bundling value. The codebook manager 630 is capable of, configured to, or operable to support a means for generating a codebook including a first set of bits corresponding to a set of multiple downlink shared channel occasions. The bundling manager 635 is capable of, configured to, or operable to support a means for bundling the first set of bits into a second set of bits, each bit of the second set of bits corresponding to a respective subset of the first set of bits, where a quantity of bits of each subset of the first set of bits is based on the bundling value. The feedback manager 640 is capable of, configured to, or operable to support a means for transmitting a feedback message including the codebook including the second set of bits.

In some examples, the cross-DCI bundling manager 645 is capable of, configured to, or operable to support a means for receiving a first downlink control information message indicating a first portion of the set of multiple downlink shared channel occasions. In some examples, the cross-DCI bundling manager 645 is capable of, configured to, or operable to support a means for receiving a second downlink control information message indicating a second portion of the set of multiple downlink shared channel occasions, where at least one subset of the first set of bits corresponds to one or more downlink shared channel occasions of the first portion of the set of multiple downlink shared channel occasions and one or more downlink shared channel occasions of the second portion of the set of multiple downlink shared channel occasions.

In some examples, the bundling manager 635 is capable of, configured to, or operable to support a means for monitoring for downlink signaling via the set of multiple downlink shared channel occasions. In some examples, the bundling manager 635 is capable of, configured to, or operable to support a means for setting a first bit of the second set of bits to indicate an acknowledgement message based on receiving the downlink signaling via each downlink shared channel occasion corresponding to a first subset of the set of multiple downlink shared channel occasions and a respective first subset of the first set of bits.

In some examples, the bundling manager 635 is capable of, configured to, or operable to support a means for monitoring for downlink signaling via the set of multiple downlink shared channel occasions. In some examples, the bundling manager 635 is capable of, configured to, or operable to support a means for setting a first bit of the second set of bits to indicate a negative acknowledgement message based on failing to receive the downlink signaling via one or more downlink shared channel occasions corresponding to a subset of the set of multiple downlink shared channel occasions and a respective first subset of the first set of bits.

In some examples, the feedback manager 640 is capable of, configured to, or operable to support a means for transmitting, via the feedback message, a bit indicating a presence of at least one feedback error, the feedback error indicating that that at least one bit of the second set of bits indicates a negative acknowledgement message for a first subset of the first set of bits, where at least one of the first subset of the first set of bits indicates an acknowledgement message for at least one respective downlink shared channel occasion.

In some examples, the retransmission manager 655 is capable of, configured to, or operable to support a means for receiving control signaling triggering retransmission of the first set of bits based on the bit indicating the at least one feedback error.

In some examples, the feedback manager 640 is capable of, configured to, or operable to support a means for transmitting, via the feedback message, a third set of bits, each bit of the third set of bits indicating whether a respective bit of the second set of bits corresponds to a feedback error, the feedback error indicating that the respective bit of the second set of bits indicates a negative acknowledgement message for a first subset of the first set of bits, where at least one bit of the first subset of the first set of bits indicates an acknowledgement message for at least one downlink shared channel occasion.

In some examples, the retransmission manager 655 is capable of, configured to, or operable to support a means for receiving control signaling triggering retransmission of at least the first subset of the first set of bits based on the third set of bits indicating that a respective bit of the second set of bits corresponds to the feedback error.

In some examples, the feedback error manager 650 is capable of, configured to, or operable to support a means for transmitting, via the feedback message, an indication that a quantity of feedback errors in the second set of bits satisfies a threshold, where each feedback error of the quantity of feedback errors indicates that at least one bit of the second set of bits indicates a negative acknowledgement message for a first subset of the first set of bits, where one of the first subset of the first set of bits indicates an acknowledgement message for a respective downlink shared channel occasion.

In some examples, the feedback error manager 650 is capable of, configured to, or operable to support a means for receiving control signaling indicating the threshold, where transmitting the indication that the quantity of feedback errors satisfies the threshold is based on receiving the control signaling indicating the threshold.

Figure 7:
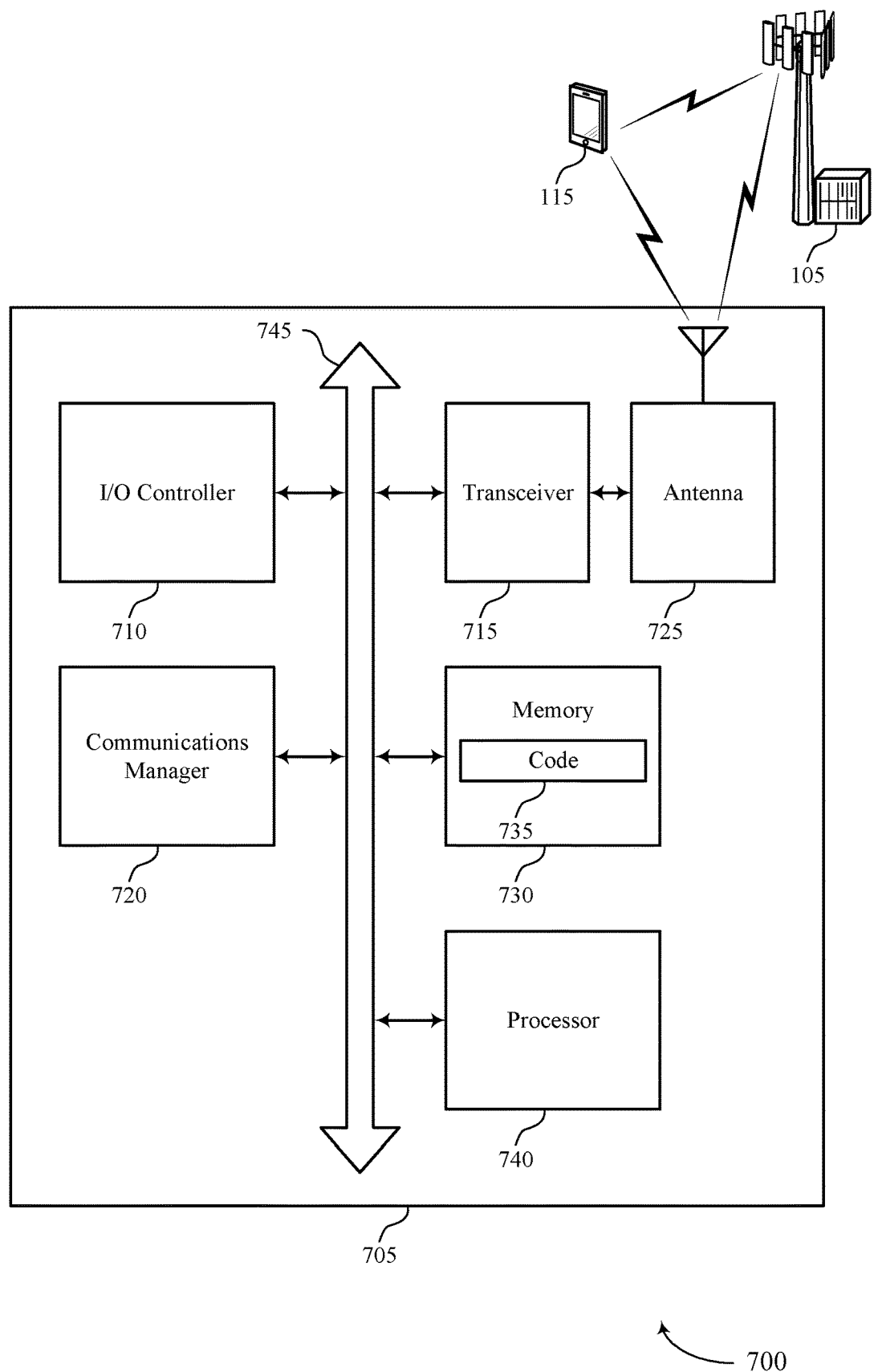
FIG. 7 shows a diagram of a system including a device that supports feedback codebooks with bundling in accordance with one or more aspects of the present disclosure.

FIG. 7 shows a diagram of a system 700 including a device 705 that supports feedback codebooks with bundling in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable code 735 including instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may contain, among other things, a basic I/O system (BIOS) which may control basic hardware or software operation such as the interaction with peripheral components or devices.

The at least one processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting feedback codebooks with bundling). For example, the device 705 or a component of the device 705 may include at least one processor 740 and at least one memory 730 coupled with or to the at least one processor 740, the at least one processor 740 and at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions herein.

The communications manager 720 may support wireless communications in accordance with examples as disclosed herein. For example, the communications manager 720 is capable of, configured to, or operable to support a means for receiving control signaling enabling feedback codebook bundling and indicating a bundling value. The communications manager 720 is capable of, configured to, or operable to support a means for generating a codebook including a first set of bits corresponding to a set of multiple downlink shared channel occasions. The communications manager 720 is capable of, configured to, or operable to support a means for bundling the first set of bits into a second set of bits, each bit of the second set of bits corresponding to a respective subset of the first set of bits, where a quantity of bits of each subset of the first set of bits is based on the bundling value. The communications manager 720 is capable of, configured to, or operable to support a means for transmitting a feedback message including the codebook including the second set of bits.

By including or configuring the communications manager 720 in accordance with examples as described herein, the device 705 may support techniques for feedback codebook bundling resulting in decreased signaling overhead, more efficient use of system resources, decreased system latency, decreased power expenditure by the UE, and improved user experience.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of feedback codebooks with bundling as described herein, or the at least one processor 740 and the at least one memory 730 may be otherwise configured to, individually or collectively, perform or support such operations.

Figure 8:
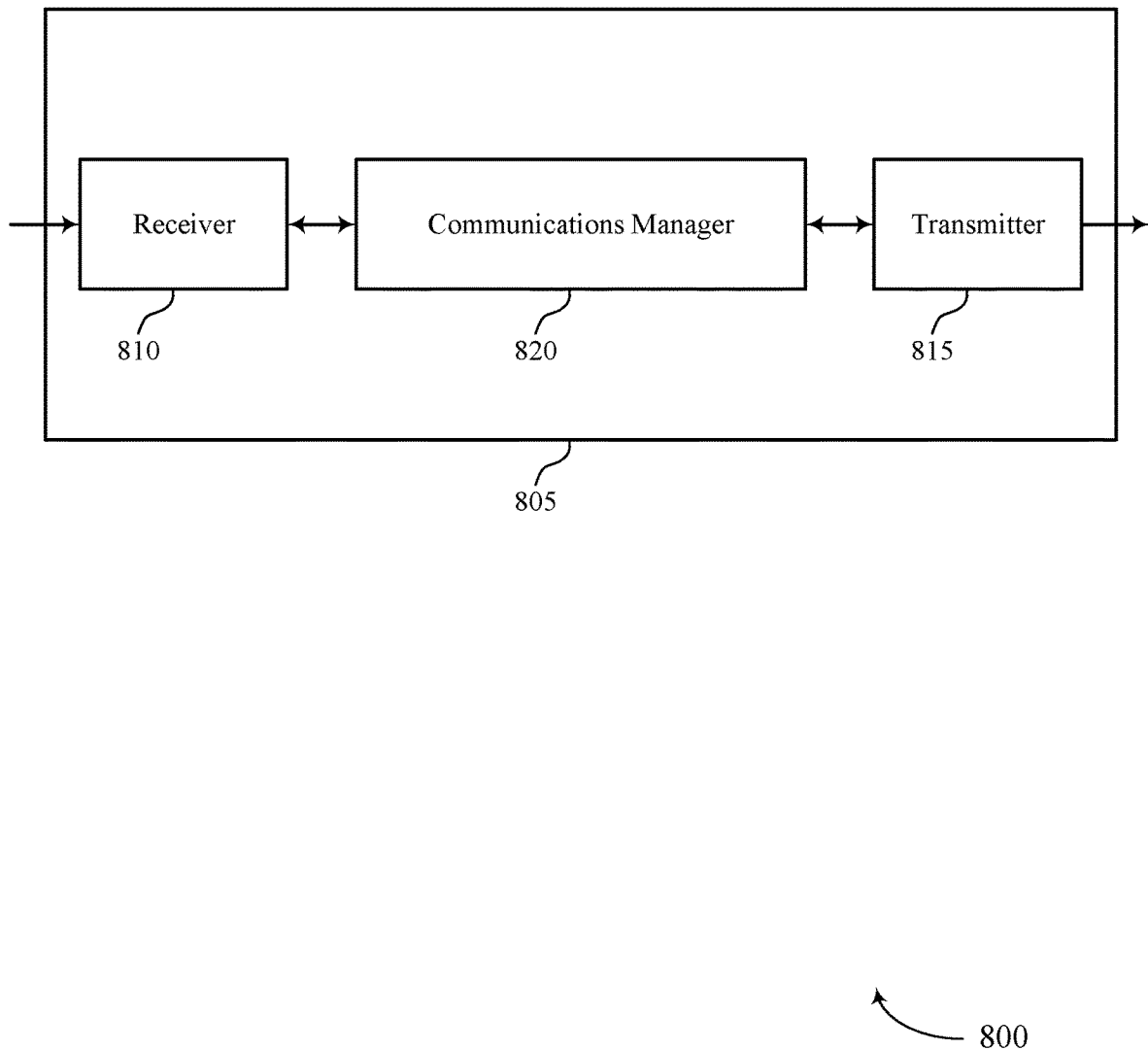
FIGS. 8 and 9 show block diagrams of devices that support feedback codebooks with bundling in accordance with one or more aspects of the present disclosure.

FIG. 8 shows a block diagram 800 of a device 805 that supports feedback codebooks with bundling in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of feedback codebooks with bundling as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for transmitting control signaling enabling feedback codebook bundling and indicating a bundling value. The communications manager 820 is capable of, configured to, or operable to support a means for receiving a feedback message based on transmitting the control signaling, where a first set of bits of a codebook corresponding to a set of multiple downlink shared channel occasions is bundled into a second set of bits, each bit of the second set of bits corresponding to a respective subset of the first set of bits, where a quantity of bits of each subset of the first set of bits is based on the bundling value. The communications manager 820 is capable of, configured to, or operable to support a means for decoding the feedback message according to the codebook and based on the bundling value.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for feedback codebook bundling resulting in decreased signaling overhead, more efficient use of system resources, decreased system latency, decreased power expenditure by the UE, and improved user experience.

Figure 9:
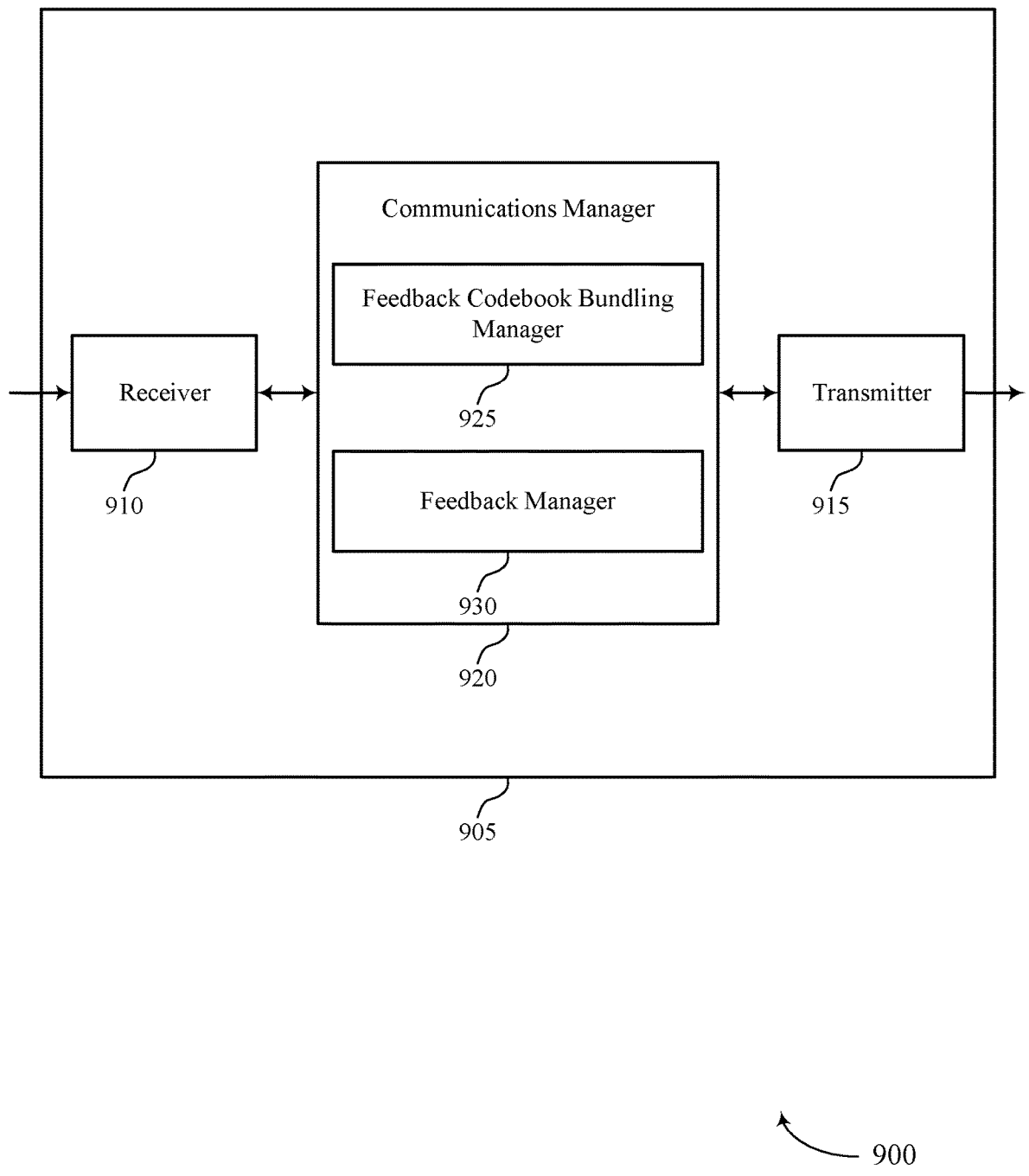

FIG. 9 shows a block diagram 900 of a device 905 that supports feedback codebooks with bundling in accordance with one or more aspects of the present disclosure. The device 905 may be an example of aspects of a device 805 or a network entity 105 as described herein. The device 905 may include a receiver 910, a transmitter 915, and a communications manager 920. The device 905, or one of more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of feedback codebooks with bundling as described herein. For example, the communications manager 920 may include a feedback codebook bundling manager 925 a feedback manager 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The feedback codebook bundling manager 925 is capable of, configured to, or operable to support a means for transmitting control signaling enabling feedback codebook bundling and indicating a bundling value. The feedback manager 930 is capable of, configured to, or operable to support a means for receiving a feedback message based on transmitting the control signaling, where a first set of bits of a codebook corresponding to a set of multiple downlink shared channel occasions is bundled into a second set of bits, each bit of the second set of bits corresponding to a respective subset of the first set of bits, where a quantity of bits of each subset of the first set of bits is based on the bundling value. The feedback manager 930 is capable of, configured to, or operable to support a means for decoding the feedback message according to the codebook and based on the bundling value.

Figure 10:
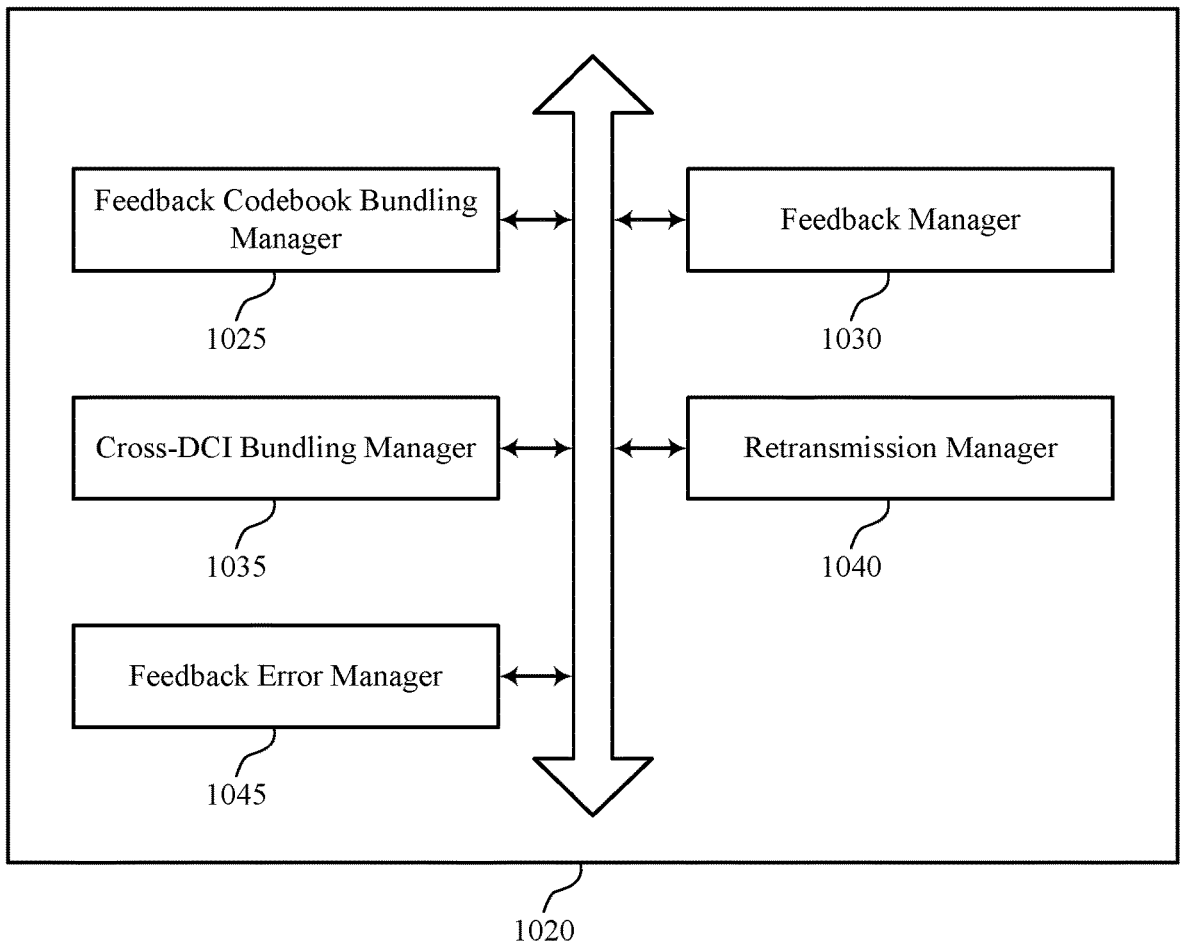
FIG. 10 shows a block diagram of a communications manager that supports feedback codebooks with bundling in accordance with one or more aspects of the present disclosure.

FIG. 10 shows a block diagram 1000 of a communications manager 1020 that supports feedback codebooks with bundling in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of feedback codebooks with bundling as described herein. For example, the communications manager 1020 may include a feedback codebook bundling manager 1025, a feedback manager 1030, a cross-DCI bundling manager 1035, a retransmission manager 1040, a feedback error manager 1045, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications in accordance with examples as disclosed herein. The feedback codebook bundling manager 1025 is capable of, configured to, or operable to support a means for transmitting control signaling enabling feedback codebook bundling and indicating a bundling value. The feedback manager 1030 is capable of, configured to, or operable to support a means for receiving a feedback message based on transmitting the control signaling, where a first set of bits of a codebook corresponding to a set of multiple downlink shared channel occasions is bundled into a second set of bits, each bit of the second set of bits corresponding to a respective subset of the first set of bits, where a quantity of bits of each subset of the first set of bits is based on the bundling value. In some examples, the feedback manager 1030 is capable of, configured to, or operable to support a means for decoding the feedback message according to the codebook and based on the bundling value.

In some examples, the cross-DCI bundling manager 1035 is capable of, configured to, or operable to support a means for transmitting a first downlink control information message indicating a first portion of the set of multiple downlink shared channel occasions. In some examples, the cross-DCI bundling manager 1035 is capable of, configured to, or operable to support a means for transmitting a second downlink control information message indicating a second portion of the set of multiple downlink shared channel occasions, where at least one subset of the first set of bits corresponds to one or more downlink shared channel occasions of the first portion of the set of multiple downlink shared channel occasions and one or more downlink shared channel occasions of the second portion of the set of multiple downlink shared channel occasions.

In some examples, the feedback manager 1030 is capable of, configured to, or operable to support a means for transmitting downlink signaling via the set of multiple downlink shared channel occasions, where a first bit of the second set of bits in the feedback message indicates an acknowledgement message corresponding to the downlink signaling via each downlink shared channel occasion corresponding to a first subset of the set of multiple downlink shared channel occasions and a respective first subset of the first set of bits.

In some examples, the feedback manager 1030 is capable of, configured to, or operable to support a means for transmitting downlink signaling via the set of multiple downlink shared channel occasions, where a first bit of the second set of bits to indicates a negative acknowledgement message corresponding to a subset of the set of multiple downlink shared channel occasions and a respective first subset of the first set of bits.

In some examples, the feedback manager 1030 is capable of, configured to, or operable to support a means for receiving, via the feedback message, a bit indicating a presence of at least one feedback error, the feedback error indicating that that at least one bit of the second set of bits indicates a negative acknowledgement message for a first subset of the first set of bits, where at least one of the first subset of the first set of bits indicates an acknowledgement message for at least one respective downlink shared channel occasion.

In some examples, the retransmission manager 1040 is capable of, configured to, or operable to support a means for transmitting control signaling triggering retransmission of the first set of bits based on the bit indicating the at least one feedback error. In some examples, the retransmission manager 1040 is capable of, configured to, or operable to support a means for receiving a second feedback message including the first set of bits based on transmitting the control signaling.

In some examples, the retransmission manager 1040 is capable of, configured to, or operable to support a means for receiving, via the feedback message, a third set of bits, each bit of the third set of bits indicating whether a respective bit of the second set of bits corresponds to a feedback error, the feedback error indicating that the respective bit of the second set of bits indicates a negative acknowledgement message for a first subset of the first set of bits, where at least one bit of the first subset of the first set of bits indicates an acknowledgement message for at least one downlink shared channel occasion.

In some examples, the retransmission manager 1040 is capable of, configured to, or operable to support a means for transmitting control signaling triggering retransmission of at least the first subset of the first set of bits based on the third set of bits indicating that a respective bit of the second set of bits corresponds to the feedback error. In some examples, the feedback manager 1030 is capable of, configured to, or operable to support a means for receiving a second feedback message including at least the first subset of the first set of bits based on transmitting the control signaling.

In some examples, the feedback error manager 1045 is capable of, configured to, or operable to support a means for receiving, via the feedback message, an indication that a quantity of feedback errors in the second set of bits satisfies a threshold, where each feedback error of the quantity of feedback errors indicates that at least one bit of the second set of bits indicates a negative acknowledgement message for a first subset of the first set of bits, where one of the first subset of the first set of bits indicates an acknowledgement message for a respective downlink shared channel occasion.

In some examples, the feedback error manager 1045 is capable of, configured to, or operable to support a means for transmitting control signaling indicating the threshold, where receiving the indication that the quantity of feedback errors satisfies the threshold is based on transmitting the control signaling indicating the threshold.

Figure 11:
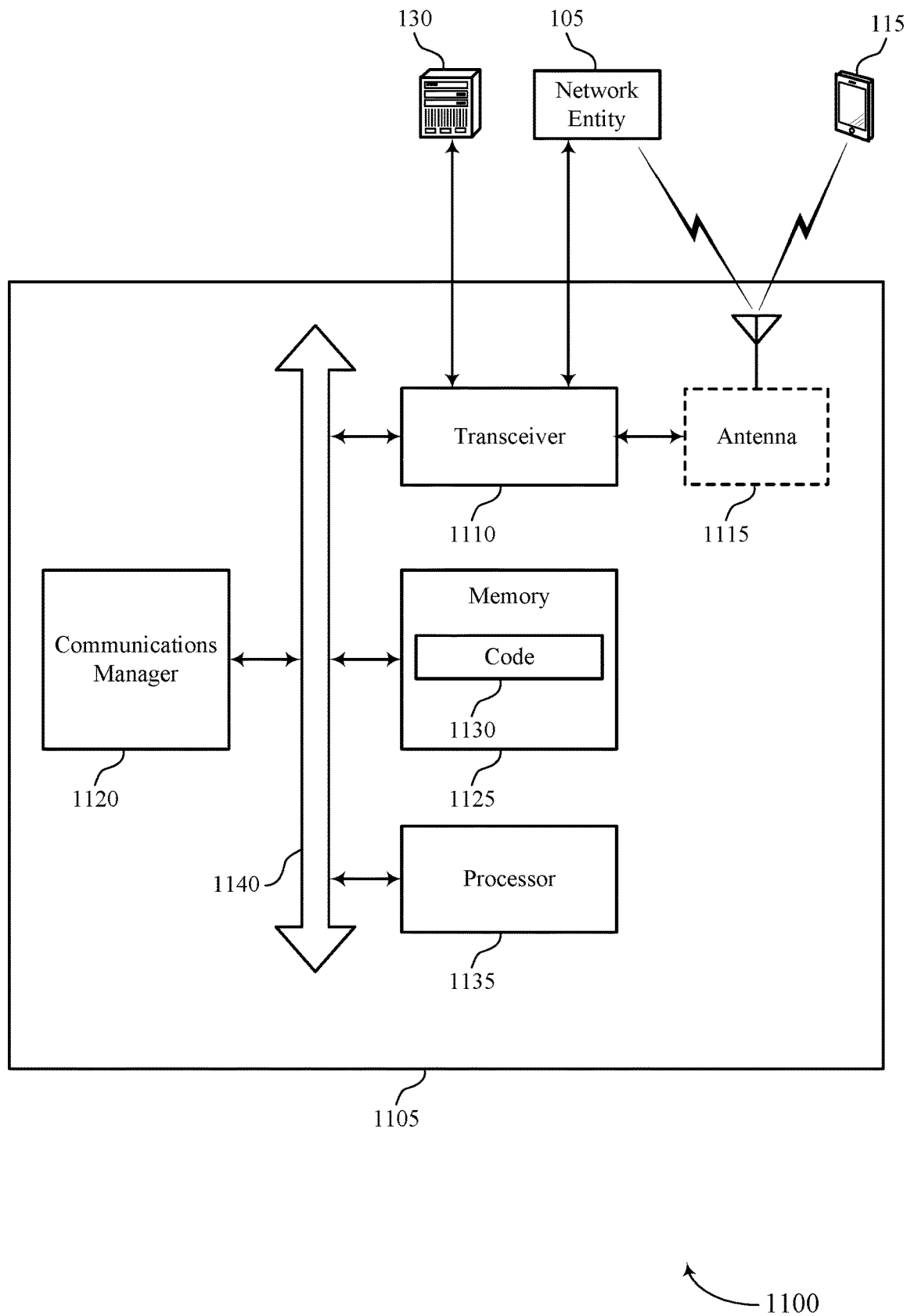
FIG. 11 shows a diagram of a system including a device that supports feedback codebooks with bundling in accordance with one or more aspects of the present disclosure.

FIG. 11 shows a diagram of a system 1100 including a device 1105 that supports feedback codebooks with bundling in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., a communication link 125, a backhaul communication link 120, a midhaul communication link 162, a fronthaul communication link 168).

The at least one memory 1125 may include RAM, ROM, or any combination thereof. The at least one memory 1125 may store computer-readable, computer-executable code 1130 including instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may contain, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1135 may be configured to operate a memory array using a memory controller. In some other cases, a memory controller may be integrated into one or more of the at least one processor

1135. The at least one processor 1135 may be configured to execute computer-readable instructions stored in a memory (e.g., one or more of the at least one memory 1125) to cause the device 1105 to perform various functions (e.g., functions or tasks supporting feedback codebooks with bundling). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125). In some implementations, the at least one processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the at least one processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1105 may transmit information output from the chip or modem. Additionally, or alternatively, in some implementations, the one or more interfaces may refer to an interface between the processing system of the chip or modem and a receiver, such that the device 1105 may obtain information or signal inputs, and the information may be passed to the processing system. A person having ordinary skill in the art will readily recognize that a first interface also may obtain information or signal inputs, and a second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications in accordance with examples as disclosed herein. For example, the communications manager 1120 is capable of, configured to, or operable to support a means for transmitting control signaling enabling feedback codebook bundling and indicating a bundling value. The communications manager 1120 is capable of, configured to, or operable to support a means for receiving a feedback message based on transmitting the control signaling, where a first set of bits of a codebook corresponding to a set of multiple downlink shared channel occasions is bundled into a second set of bits, each bit of the second set of bits corresponding to a respective subset of the first set of bits, where a quantity of bits of each subset of the first set of bits is based on the bundling value. The communications manager 1120 is capable of, configured to, or operable to support a means for decoding the feedback message according to the codebook and based on the bundling value.

By including or configuring the communications manager 1120 in accordance with examples as described herein, the device 1105 may support techniques for feedback codebook bundling resulting in decreased signaling overhead, more efficient use of system resources, decreased system latency, decreased power expenditure by the UE, and improved user experience.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of feedback codebooks with bundling as described herein, or the at least one processor 1135 and the at least one memory 1125 may be otherwise configured to, individually or collectively, perform or support such operations.

Figure 12:
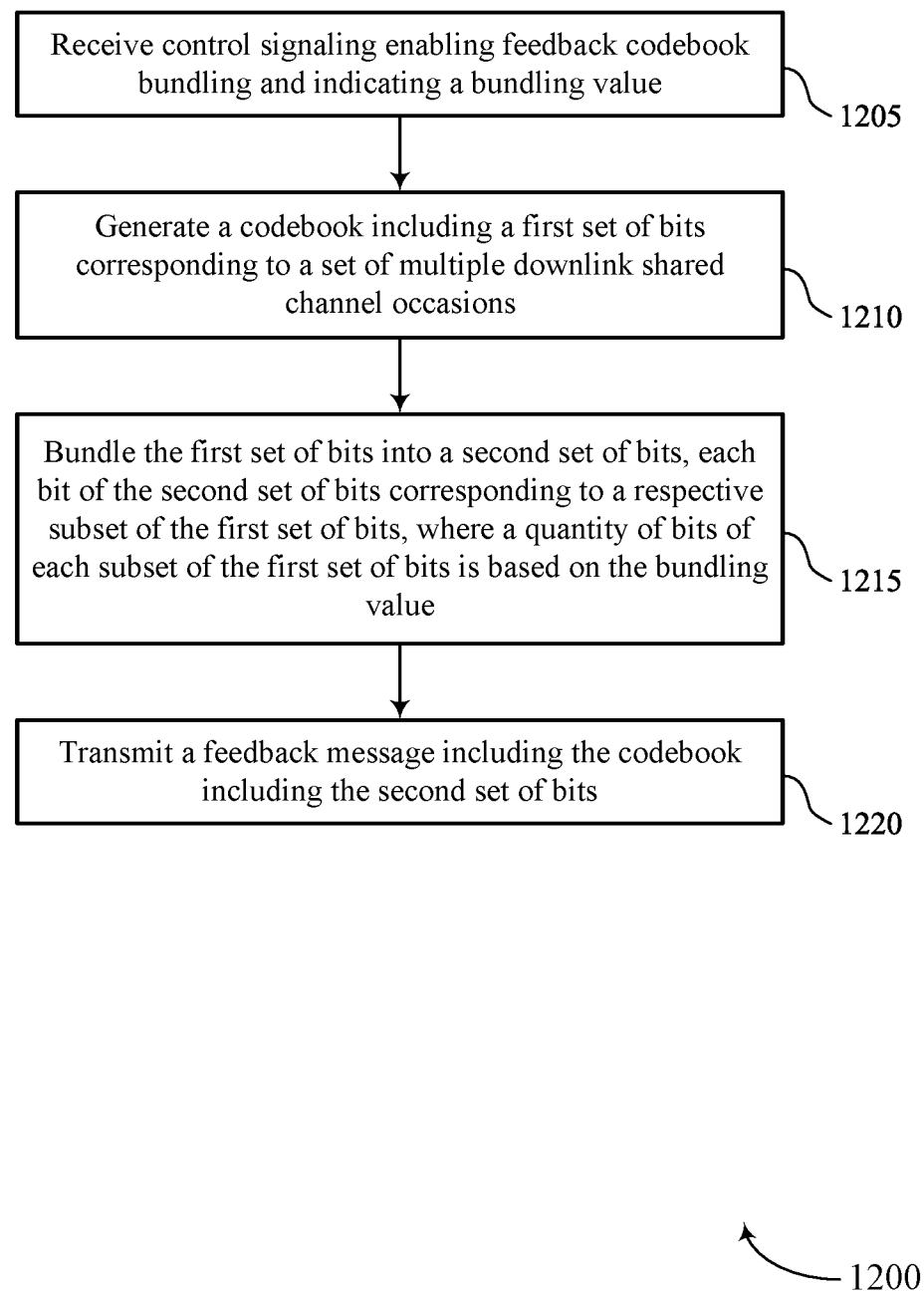
FIGS. 12 through 15 show flowcharts illustrating methods that support feedback codebooks with bundling in accordance with one or more aspects of the present disclosure.

FIG. 12 shows a flowchart illustrating a method 1200 that supports feedback codebooks with bundling in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving control signaling enabling feedback codebook bundling and indicating a bundling value. The operations of block 1205 may be performed in accordance with examples as disclosed herein. In some examples, aspects of the operations of 1205 may be performed by a feedback codebook bundling manager 625 as described with reference to FIG. 6.

At 1210, the method may include generating a codebook including a first set of bits corresponding to a set of multiple downlink shared channel occasions. The operations of block 1210 may be performed in accordance with examples as disclosed herein. In some examples, aspects of the operations of 1210 may be performed by a codebook manager 630 as described with reference to FIG. 6.

At 1215, the method may include bundling the first set of bits into a second set of bits, each bit of the second set of bits corresponding to a respective subset of the first set of bits, where a quantity of bits of each subset of the first set of bits is based on the bundling value. The operations of block 1215 may be performed in accordance with examples as disclosed herein. In some examples, aspects of the operations of 1215 may be performed by a bundling manager 635 as described with reference to FIG. 6.

At 1220, the method may include transmitting a feedback message including the codebook including the second set of bits. The operations of block 1220 may be performed in accordance with examples as disclosed herein. In some examples, aspects of the operations of 1220 may be performed by a feedback manager 640 as described with reference to FIG. 6.

Figure 13:
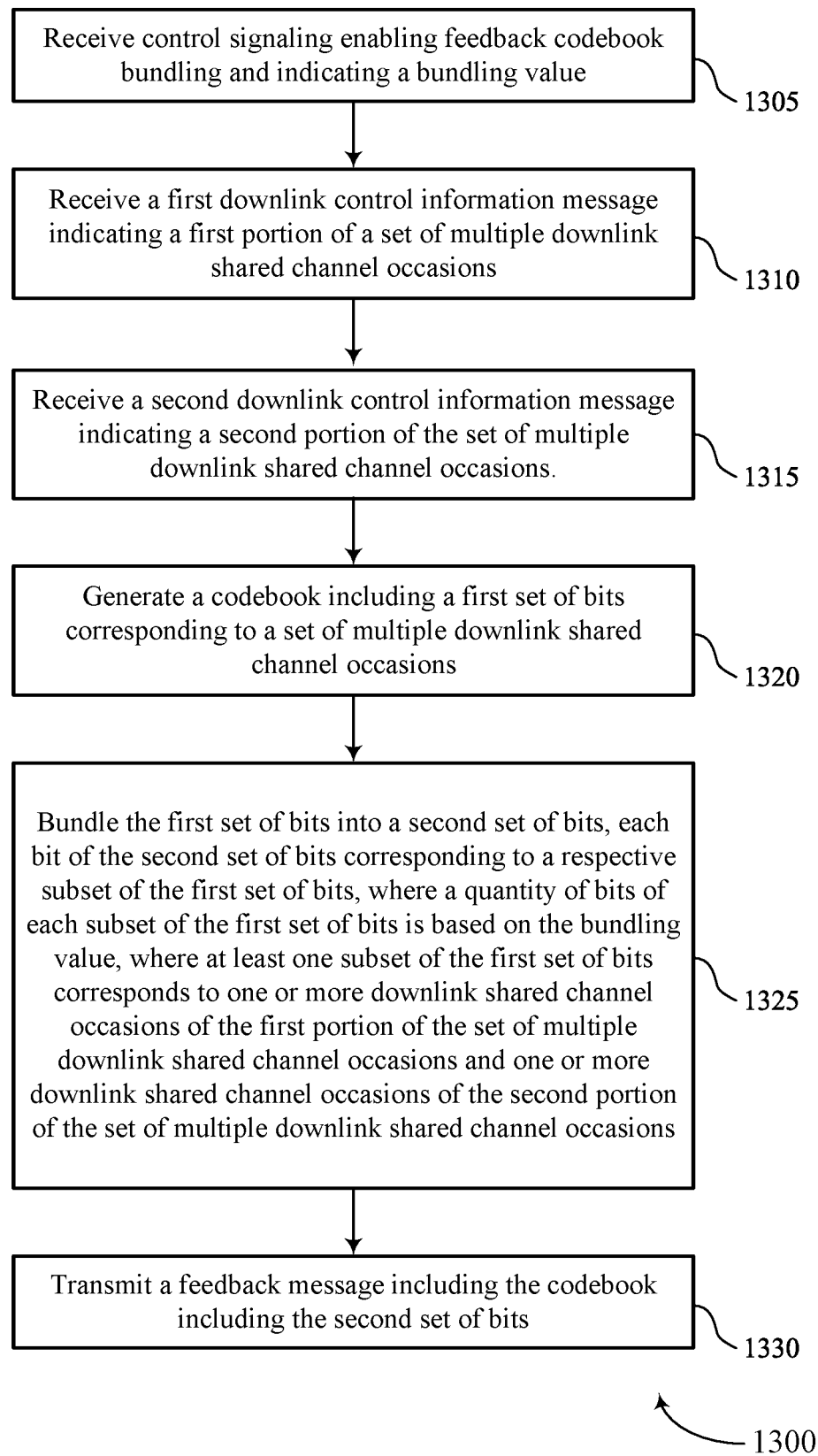

FIG. 13 shows a flowchart illustrating a method 1300 that supports feedback codebooks with bundling in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving control signaling enabling feedback codebook bundling and indicating a bundling value. The operations of block 1305 may be performed in accordance with examples as disclosed herein. In some examples, aspects of the operations of 1305 may be performed by a feedback codebook bundling manager 625 as described with reference to FIG. 6.

At 1310, the method may include receiving a first downlink control information message indicating a first portion of a set of multiple downlink shared channel occasions. The operations of block 1310 may be performed in accordance with examples as disclosed herein. In some examples, aspects of the operations of 1310 may be performed by a cross-DCI bundling manager 645 as described with reference to FIG. 6.

At 1315, the method may include receiving a second downlink control information message indicating a second portion of the set of multiple downlink shared channel occasions. The operations of block 1315 may be performed in accordance with examples as disclosed herein. In some examples, aspects of the operations of 1315 may be performed by a cross-DCI bundling manager 645 as described with reference to FIG. 6.

At 1320, the method may include generating a codebook including a first set of bits corresponding to a set of multiple downlink shared channel occasions. The operations of block 1320 may be performed in accordance with examples as disclosed herein. In some examples, aspects of the operations of 1320 may be performed by a codebook manager 630 as described with reference to FIG. 6.

At 1325, the method may include bundling the first set of bits into a second set of bits, each bit of the second set of bits corresponding to a respective subset of the first set of bits, where a quantity of bits of each subset of the first set of bits is based on the bundling value, where at least one subset of the first set of bits corresponds to one or more downlink shared channel occasions of the first portion of the set of multiple downlink shared channel occasions and one or more downlink shared channel occasions of the second portion of the set of multiple downlink shared channel occasions. The operations of block 1325 may be performed in accordance with examples as disclosed herein. In some examples, aspects of the operations of 1325 may be performed by a bundling manager 635 as described with reference to FIG. 6.

At 1330, the method may include transmitting a feedback message including the codebook including the second set of bits. The operations of block 1330 may be performed in accordance with examples as disclosed herein. In some examples, aspects of the operations of 1330 may be performed by a feedback manager 640 as described with reference to FIG. 6.

Figure 14:
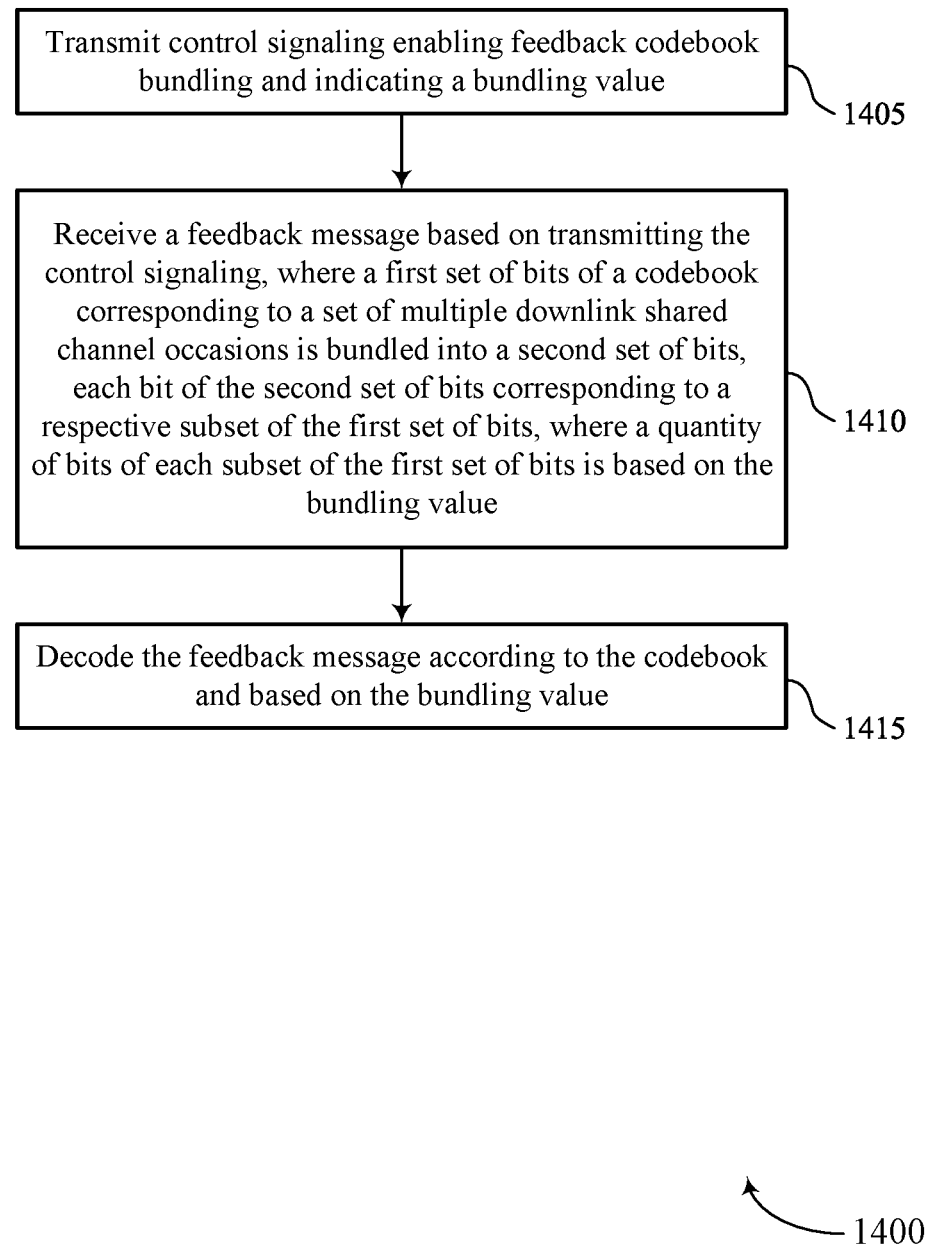

FIG. 14 shows a flowchart illustrating a method 1400 that supports feedback codebooks with bundling in accordance with aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1405, the method may include transmitting control signaling enabling feedback codebook bundling and indicating a bundling value. The operations of block 1405 may be performed in accordance with examples as disclosed herein. In some examples, aspects of the operations of 1405 may be performed by a feedback codebook bundling manager 1025 as described with reference to FIG. 10.

At 1410, the method may include receiving a feedback message based on transmitting the control signaling, where a first set of bits of a codebook corresponding to a set of multiple downlink shared channel occasions is bundled into a second set of bits, each bit of the second set of bits corresponding to a respective subset of the first set of bits, where a quantity of bits of each subset of the first set of bits is based on the bundling value. The operations of block 1410 may be performed in accordance with examples as disclosed herein. In some examples, aspects of the operations of 1410 may be performed by a feedback manager 1030 as described with reference to FIG. 10.

At 1415, the method may include decoding the feedback message according to the codebook and based on the bundling value. The operations of block 1415 may be performed in accordance with examples as disclosed herein. In some examples, aspects of the operations of 1415 may be performed by a feedback manager 1030 as described with reference to FIG. 10.

Figure 15:
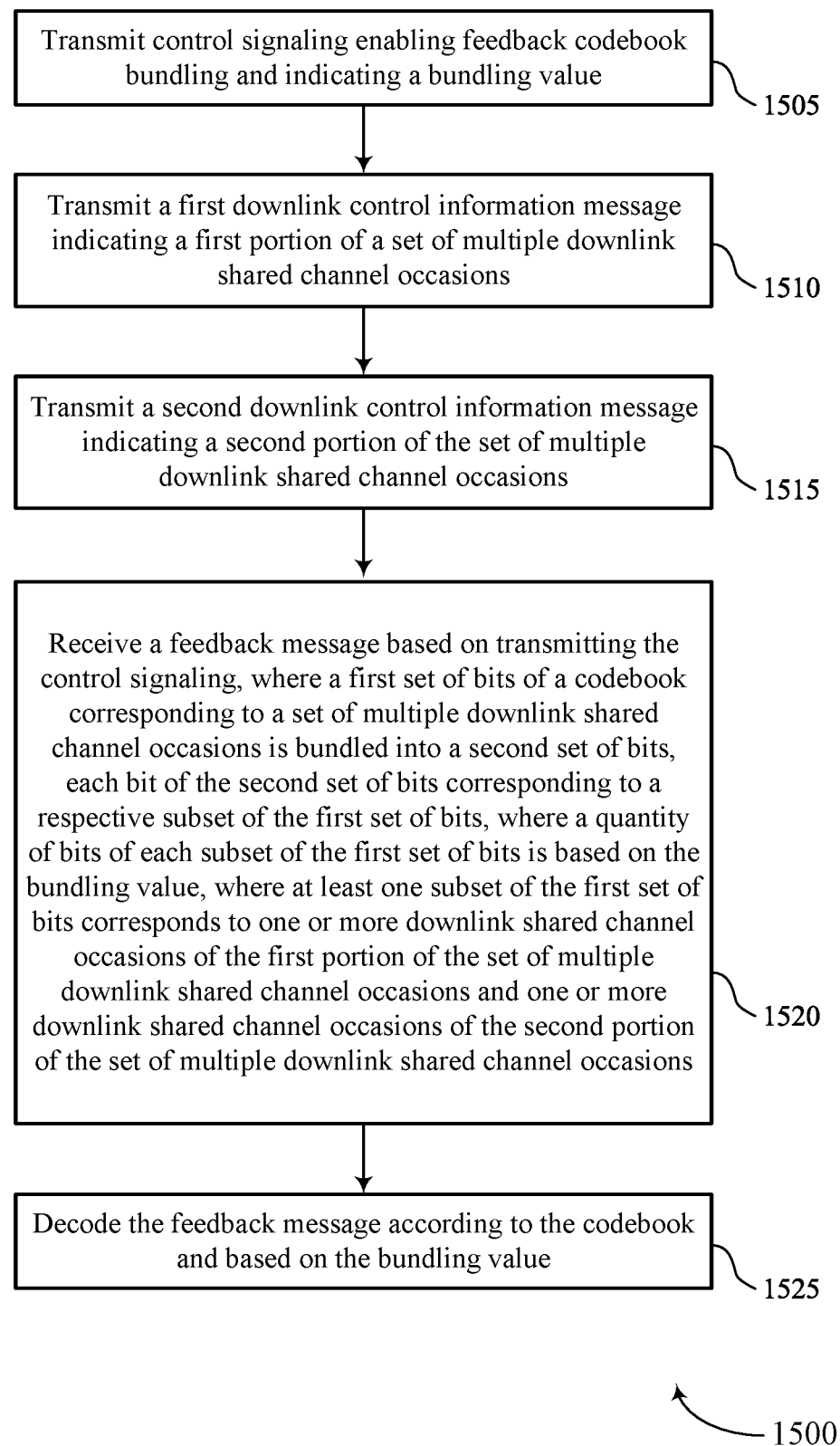

FIG. 15 shows a flowchart illustrating a method 1500 that supports feedback codebooks with bundling in accordance with aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include transmitting control signaling enabling feedback codebook bundling and indicating a bundling value. The operations of block 1505 may be performed in accordance with examples as disclosed herein. In some examples, aspects of the operations of 1505 may be performed by a feedback codebook bundling manager 1025 as described with reference to FIG. 10.

At 1510, the method may include transmitting a first downlink control information message indicating a first portion of a set of multiple downlink shared channel occasions. The operations of block 1510 may be performed in accordance with examples as disclosed herein. In some examples, aspects of the operations of 1510 may be performed by a cross-DCI bundling manager 1035 as described with reference to FIG. 10.

At 1515, the method may include transmitting a second downlink control information message indicating a second portion of the set of multiple downlink shared channel occasions. The operations of block 1515 may be performed in accordance with examples as disclosed herein. In some examples, aspects of the operations of 1515 may be performed by a cross-DCI bundling manager 1035 as described with reference to FIG. 10.

At 1520, the method may include receiving a feedback message based on transmitting the control signaling, where a first set of bits of a codebook corresponding to a set of multiple downlink shared channel occasions is bundled into a second set of bits, each bit of the second set of bits corresponding to a respective subset of the first set of bits, where a quantity of bits of each subset of the first set of bits is based on the bundling value, where at least one subset of the first set of bits corresponds to one or more downlink shared channel occasions of the first portion of the set of multiple downlink shared channel occasions and one or more downlink shared channel occasions of the second portion of the set of multiple downlink shared channel occasions. The operations of block 1520 may be performed in accordance with examples as disclosed herein. In some examples, aspects of the operations of 1520 may be performed by a feedback manager 1030 as described with reference to FIG. 10.

At 1525, the method may include decoding the feedback message according to the codebook and based on the bundling value. The operations of block 1525 may be performed in accordance with examples as disclosed herein. In some examples, aspects of the operations of 1525 may be performed by a feedback manager 1030 as described with reference to FIG. 10.

The following provides an overview of aspects of the present disclosure:

Aspect 1: A method for wireless communications at a UE, comprising: receiving control signaling enabling feedback codebook bundling and indicating a bundling value; generating a codebook comprising a first set of bits corresponding to a plurality of downlink shared channel occasions; bundling the first set of bits into a second set of bits, each bit of the second set of bits corresponding to a respective subset of the first set of bits, wherein a quantity of bits of each subset of the first set of bits is based at least in part on the bundling value; and transmitting a feedback message comprising the codebook comprising the second set of bits.

Aspect 2: The method of aspect 1, further comprising: receiving a first downlink control information message indicating a first portion of the plurality of downlink shared channel occasions; and receiving a second downlink control information message indicating a second portion of the plurality of downlink shared channel occasions, wherein at least one subset of the first set of bits corresponds to one or more downlink shared channel occasions of the first portion of the plurality of downlink shared channel occasions and one or more downlink shared channel occasions of the second portion of the plurality of downlink shared channel occasions.

Aspect 3: The method of any of aspects 1 through 2, further comprising: monitoring for downlink signaling via the plurality of downlink shared channel occasions; and setting a first bit of the second set of bits to indicate an acknowledgement message based at least in part on receiving the downlink signaling via each downlink shared channel occasion corresponding to a first subset of the plurality of downlink shared channel occasions and a respective first subset of the first set of bits.

Aspect 4: The method of any of aspects 1 through 3, further comprising: monitoring for downlink signaling via the plurality of downlink shared channel occasions; and setting a first bit of the second set of bits to indicate a negative acknowledgement message based at least in part on failing to receive the downlink signaling via one or more downlink shared channel occasions corresponding to a subset of the plurality of downlink shared channel occasions and a respective first subset of the first set of bits.

Aspect 5: The method of any of aspects 1 through 4, further comprising: transmitting, via the feedback message, a bit indicating that at least one bit of the second set of bits indicates a negative acknowledgement message for a first subset of the first set of bits, wherein at least one of the first subset of the first set of bits indicates an acknowledgement message for at least one respective downlink shared channel occasion.

Aspect 6: The method of aspect 5, further comprising: receiving control signaling triggering retransmission of the first set of bits based at least in part on the bit indicating the at least one feedback error.

Aspect 7: The method of any of aspects 1 through 6, further comprising: transmitting, via the feedback message, a third set of bits, each bit of the third set of bits indicating whether a respective bit of the second set of bits corresponds to a feedback error, the feedback error indicating that the respective bit of the second set of bits indicates a negative acknowledgement message for a first subset of the first set of bits, wherein at least one bit of the first subset of the first set of bits indicates an acknowledgement message for at least one downlink shared channel occasion.

Aspect 8: The method of aspect 7, further comprising: receiving control signaling triggering retransmission of at least the first subset of the first set of bits based at least in part on the third set of bits indicating that a respective bit of the second set of bits corresponds to the feedback error.

Aspect 9: The method of any of aspects 1 through 8, further comprising: transmitting, via the feedback message, an indication that a quantity of feedback errors in the second set of bits satisfies a threshold, wherein each feedback error of the quantity of feedback errors indicates that at least one bit of the second set of bits indicates a negative acknowledgement message for a first subset of the first set of bits, wherein one of the first subset of the first set of bits indicates an acknowledgement message for a respective downlink shared channel occasion.

Aspect 10: The method of aspect 9, further comprising: receiving control signaling indicating the threshold, wherein transmitting the indication that the quantity of feedback errors satisfies the threshold is based at least in part on receiving the control signaling indicating the threshold.

Aspect 11: A method for wireless communications at a network entity, comprising: transmitting control signaling enabling feedback codebook bundling and indicating a bundling value; receiving a feedback message based at least in part on transmitting the control signaling, wherein a first set of bits of a codebook corresponding to a plurality of downlink shared channel occasions is bundled into a second set of bits, each bit of the second set of bits corresponding to a respective subset of the first set of bits, wherein a quantity of bits of each subset of the first set of bits is based at least in part on the bundling value; and decoding the feedback message according to the codebook and based at least in part on the bundling value.

Aspect 12: The method of aspect 11, further comprising: transmitting a first downlink control information message indicating a first portion of the plurality of downlink shared channel occasions; and transmitting a second downlink control information message indicating a second portion of the plurality of downlink shared channel occasions, wherein at least one subset of the first set of bits corresponds to one or more downlink shared channel occasions of the first portion of the plurality of downlink shared channel occasions and one or more downlink shared channel occasions of the second portion of the plurality of downlink shared channel occasions.

Aspect 13: The method of any of aspects 11 through 12, further comprising: transmitting downlink signaling via the plurality of downlink shared channel occasions, wherein a first bit of the second set of bits in the feedback message indicates an acknowledgement message corresponding to the downlink signaling via each downlink shared channel occasion corresponding to a first subset of the plurality of downlink shared channel occasions and a respective first subset of the first set of bits.

Aspect 14: The method of any of aspects 11 through 13, further comprising: transmitting downlink signaling via the plurality of downlink shared channel occasions, wherein a first bit of the second set of bits to indicates a negative acknowledgement message corresponding to a subset of the plurality of downlink shared channel occasions and a respective first subset of the first set of bits.

Aspect 15: The method of any of aspects 11 through 14, further comprising: receiving, via the feedback message, a bit indicating that at least one bit of the second set of bits indicates a negative acknowledgement message for a first subset of the first set of bits, wherein at least one of the first subset of the first set of bits indicates an acknowledgement message for at least one respective downlink shared channel occasion.

Aspect 16: The method of aspect 15, further comprising: transmitting control signaling triggering retransmission of the first set of bits based at least in part on the bit indicating the at least one feedback error; and receiving a second feedback message comprising the first set of bits based at least in part on transmitting the control signaling.

Aspect 17: The method of any of aspects 11 through 16, further comprising: receiving, via the feedback message, a third set of bits, each bit of the third set of bits indicating whether a respective bit of the second set of bits corresponds to a feedback error, the feedback error indicating that the respective bit of the second set of bits indicates a negative acknowledgement message for a first subset of the first set of bits, wherein at least one bit of the first subset of the first set of bits indicates an acknowledgement message for at least one downlink shared channel occasion.

Aspect 18: The method of aspect 17, further comprising: transmitting control signaling triggering retransmission of at least the first subset of the first set of bits based at least in part on the third set of bits indicating that a respective bit of the second set of bits corresponds to the feedback error; and receiving a second feedback message comprising at least the first subset of the first set of bits based at least in part on transmitting the control signaling.

Aspect 19: The method of any of aspects 11 through 18, further comprising: receiving, via the feedback message, an indication that a quantity of feedback errors in the second set of bits satisfies a threshold, wherein each feedback error of the quantity of feedback errors indicates that at least one bit of the second set of bits indicates a negative acknowledgement message for a first subset of the first set of bits, wherein one of the first subset of the first set of bits indicates an acknowledgement message for a respective downlink shared channel occasion.

Aspect 20: The method of aspect 19, further comprising: transmitting control signaling indicating the threshold, wherein receiving the indication that the quantity of feedback errors satisfies the threshold is based at least in part on transmitting the control signaling indicating the threshold.

Aspect 21: A UE for wireless communications, comprising one or more memories storing processor-executable code, and one or more processors coupled with the one or more memories and individually or collectively operable to execute the code to cause the UE to perform a method of any of aspects 1 through 10.

Aspect 22: A UE for wireless communications, comprising at least one means for performing a method of any of aspects 1 through 10.

Aspect 23: A non-transitory computer-readable medium storing code for wireless communications, the code comprising instructions executable by a processor to perform a method of any of aspects 1 through 10.

Aspect 24: A network entity for wireless communications, comprising one or more memories storing processor-executable code, and one or more processors coupled with the one or more memories and individually or collectively operable to execute the code to cause the network entity to perform a method of any of aspects 11 through 20.

Aspect 25: A network entity for wireless communications, comprising at least one means for performing a method of any of aspects 11 through 20.

Aspect 26: A non-transitory computer-readable medium storing code for wireless communications, the code comprising instructions executable by a processor to perform a method of any of aspects 11 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive control signaling enabling feedback codebook bundling and indicating a bundling value;
generate a codebook comprising a first set of bits corresponding to a plurality of downlink shared channel occasions;
bundle the first set of bits into a second set of bits, each bit of the second set of bits corresponding to a respective subset of the first set of bits, wherein a quantity of bits of each subset of the first set of bits is based at least in part on the bundling value; and
transmit a feedback message comprising the codebook comprising the second set of bits.

2. The UE of claim 1, wherein the one or more processors are individually or collectively further operable to execute the code to cause the UE to:
receive a first downlink control information message indicating a first portion of the plurality of downlink shared channel occasions; and
receive a second downlink control information message indicating a second portion of the plurality of downlink shared channel occasions, wherein at least one subset of the first set of bits corresponds to one or more downlink shared channel occasions of the first portion of the plurality of downlink shared channel occasions and one or more downlink shared channel occasions of the second portion of the plurality of downlink shared channel occasions.

3. The UE of claim 1, wherein the one or more processors are individually or collectively further operable to execute the code to cause the UE to:
monitor for downlink signaling via the plurality of downlink shared channel occasions; and
set a first bit of the second set of bits to indicate an acknowledgement message based at least in part on receiving the downlink signaling via each downlink shared channel occasion corresponding to a first subset of the plurality of downlink shared channel occasions and a respective first subset of the first set of bits.

4. The UE of claim 1, wherein the one or more processors are individually or collectively further operable to execute the code to cause the UE to:
monitor for downlink signaling via the plurality of downlink shared channel occasions; and
set a first bit of the second set of bits to indicate a negative acknowledgement message based at least in part on failing to receive the downlink signaling via one or more downlink shared channel occasions corresponding to a subset of the plurality of downlink shared channel occasions and a respective first subset of the first set of bits.

5. The UE of claim 1, wherein the one or more processors are individually or collectively further operable to execute the code to cause the UE to:
transmit, via the feedback message, a bit indicating a presence of at least one feedback error, the at least one feedback error indicating that at least one bit of the second set of bits indicates a negative acknowledgement message for a first subset of the first set of bits, wherein at least one of the first subset of the first set of bits indicates an acknowledgement message for at least one respective downlink shared channel occasion.

6. The UE of claim 5, wherein the one or more processors are individually or collectively further operable to execute the code to cause the UE to:
receive control signaling triggering retransmission of the first set of bits based at least in part on the bit indicating the at least one feedback error.

7. The UE of claim 1, wherein the one or more processors are individually or collectively further operable to execute the code to cause the UE to:
transmit, via the feedback message, a third set of bits, each bit of the third set of bits indicating whether a respective bit of the second set of bits corresponds to a feedback error, the feedback error indicating that the respective bit of the second set of bits indicates a negative acknowledgement message for a first subset of the first set of bits, wherein at least one bit of the first subset of the first set of bits indicates an acknowledgement message for at least one downlink shared channel occasion.

8. The UE of claim 7, wherein the one or more processors are individually or collectively further operable to execute the code to cause the UE to:
receive control signaling triggering retransmission of at least the first subset of the first set of bits based at least in part on the third set of bits indicating that a respective bit of the second set of bits corresponds to the feedback error.

9. The UE of claim 1, wherein the one or more processors are individually or collectively further operable to execute the code to cause the UE to:
transmit, via the feedback message, an indication that a quantity of feedback errors in the second set of bits satisfies a threshold, wherein each feedback error of the quantity of feedback errors indicates that at least one bit of the second set of bits indicates a negative acknowledgement message for a first subset of the first set of bits, wherein one of the first subset of the first set of bits indicates an acknowledgement message for a respective downlink shared channel occasion.

10. The UE of claim 9, wherein the one or more processors are individually or collectively further operable to execute the code to cause the UE to:
receive control signaling indicating the threshold, wherein transmitting the indication that the quantity of feedback errors satisfies the threshold is based at least in part on receiving the control signaling indicating the threshold.

11. A network entity, comprising:
one or more memories storing processor-executable code; and
one or more processors coupled with the one or more memories and individually or collectively operable to execute the code to cause the network entity to:
transmit control signaling enabling feedback codebook bundling and indicating a bundling value;
receive a feedback message based at least in part on transmitting the control signaling, wherein a first set of bits of a codebook corresponding to a plurality of downlink shared channel occasions is bundled into a second set of bits, each bit of the second set of bits corresponding to a respective subset of the first set of bits, wherein a quantity of bits of each subset of the first set of bits is based at least in part on the bundling value; and
decode the feedback message according to the codebook and based at least in part on the bundling value.

12. The network entity of claim 11, wherein the one or more processors are individually or collectively further operable to execute the code to cause the network entity to:
transmit a first downlink control information message indicating a first portion of the plurality of downlink shared channel occasions; and
transmit a second downlink control information message indicating a second portion of the plurality of downlink shared channel occasions, wherein at least one subset of the first set of bits corresponds to one or more downlink shared channel occasions of the first portion of the plurality of downlink shared channel occasions and one or more downlink shared channel occasions of the second portion of the plurality of downlink shared channel occasions.

13. The network entity of claim 11, wherein the one or more processors are individually or collectively further operable to execute the code to cause the network entity to:
transmit downlink signaling via the plurality of downlink shared channel occasions, wherein a first bit of the second set of bits in the feedback message indicates an acknowledgement message corresponding to the downlink signaling via each downlink shared channel occasion corresponding to a first subset of the plurality of downlink shared channel occasions and a respective first subset of the first set of bits.

14. The network entity of claim 11, wherein the one or more processors are individually or collectively further operable to execute the code to cause the network entity to:
transmit downlink signaling via the plurality of downlink shared channel occasions, wherein a first bit of the second set of bits to indicates a negative acknowledgement message corresponding to a subset of the plurality of downlink shared channel occasions and a respective first subset of the first set of bits.

15. The network entity of claim 11, wherein the one or more processors are individually or collectively further operable to execute the code to cause the network entity to:
receive, via the feedback message, a bit indicating a presence of at least one feedback error, the at least one feedback error indicating that at least one bit of the second set of bits indicates a negative acknowledgement message for a first subset of the first set of bits, wherein at least one of the first subset of the first set of bits indicates an acknowledgement message for at least one respective downlink shared channel occasion.

16. The network entity of claim 15, wherein the one or more processors are individually or collectively further operable to execute the code to cause the network entity to:
transmit control signaling triggering retransmission of the first set of bits based at least in part on the bit indicating the at least one feedback error; and
receive a second feedback message comprising the first set of bits based at least in part on transmitting the control signaling.

17. The network entity of claim 11, wherein the one or more processors are individually or collectively further operable to execute the code to cause the network entity to:
receive, via the feedback message, a third set of bits, each bit of the third set of bits indicating whether a respective bit of the second set of bits corresponds to a feedback error, the feedback error indicating that the respective bit of the second set of bits indicates a negative acknowledgement message for a first subset of the first set of bits, wherein at least one bit of the first subset of the first set of bits indicates an acknowledgement message for at least one downlink shared channel occasion.

18. The network entity of claim 17, wherein the one or more processors are individually or collectively further operable to execute the code to cause the network entity to:
transmit control signaling triggering retransmission of at least the first subset of the first set of bits based at least in part on the third set of bits indicating that a respective bit of the second set of bits corresponds to the feedback error; and
receive a second feedback message comprising at least the first subset of the first set of bits based at least in part on transmitting the control signaling.

19. The network entity of claim 11, wherein the one or more processors are individually or collectively further operable to execute the code to cause the network entity to:
receive, via the feedback message, an indication that a quantity of feedback errors in the second set of bits satisfies a threshold, wherein each feedback error of the quantity of feedback errors indicates that at least one bit of the second set of bits indicates a negative acknowledgement message for a first subset of the first set of bits, wherein one of the first subset of the first set of bits indicates an acknowledgement message for a respective downlink shared channel occasion.

20. The network entity of claim 19, wherein the one or more processors are individually or collectively further operable to execute the code to cause the network entity to:
transmit control signaling indicating the threshold, wherein receiving the indication that the quantity of feedback errors satisfies the threshold is based at least in part on transmitting the control signaling indicating the threshold.

21. A method for wireless communications at a user equipment (UE), comprising:
receiving control signaling enabling feedback codebook bundling and indicating a bundling value;
generating a codebook comprising a first set of bits corresponding to a plurality of downlink shared channel occasions;
bundling the first set of bits into a second set of bits, each bit of the second set of bits corresponding to a respective subset of the first set of bits, wherein a quantity of bits of each subset of the first set of bits is based at least in part on the bundling value; and
transmitting a feedback message comprising the codebook comprising the second set of bits.

22. The method of claim 21, further comprising:
receiving a first downlink control information message indicating a first portion of the plurality of downlink shared channel occasions; and
receiving a second downlink control information message indicating a second portion of the plurality of downlink shared channel occasions, wherein at least one subset of the first set of bits corresponds to one or more downlink shared channel occasions of the first portion of the plurality of downlink shared channel occasions and one or more downlink shared channel occasions of the second portion of the plurality of downlink shared channel occasions.

23. The method of claim 21, further comprising:
monitoring for downlink signaling via the plurality of downlink shared channel occasions; and
setting a first bit of the second set of bits to indicate an acknowledgement message based at least in part on receiving the downlink signaling via each downlink shared channel occasion corresponding to a first subset of the plurality of downlink shared channel occasions and a respective first subset of the first set of bits.

24. The method of claim 21, further comprising:
monitoring for downlink signaling via the plurality of downlink shared channel occasions; and
setting a first bit of the second set of bits to indicate a negative acknowledgement message based at least in part on failing to receive the downlink signaling via one or more downlink shared channel occasions corresponding to a subset of the plurality of downlink shared channel occasions and a respective first subset of the first set of bits.

25. The method of claim 21, further comprising:
transmitting, via the feedback message, a bit indicating a presence of at least one feedback error, the at least one feedback error indicating that that at least one bit of the second set of bits indicates a negative acknowledgement message for a first subset of the first set of bits, wherein at least one of the first subset of the first set of bits indicates an acknowledgement message for at least one respective downlink shared channel occasion.

26. The method of claim 25, further comprising:
receiving control signaling triggering retransmission of the first set of bits based at least in part on the bit indicating the at least one feedback error.

27. The method of claim 21, further comprising:
transmitting, via the feedback message, a third set of bits, each bit of the third set of bits indicating whether a respective bit of the second set of bits corresponds to a feedback error, the feedback error indicating that the respective bit of the second set of bits indicates a negative acknowledgement message for a first subset of the first set of bits, wherein at least one bit of the first subset of the first set of bits indicates an acknowledgement message for at least one downlink shared channel occasion.

28. The method of claim 27, further comprising:
receiving control signaling triggering retransmission of at least the first subset of the first set of bits based at least in part on the third set of bits indicating that a respective bit of the second set of bits corresponds to the feedback error.

29. The method of claim 21, further comprising:
transmitting, via the feedback message, an indication that a quantity of feedback errors in the second set of bits satisfies a threshold, wherein each feedback error of the quantity of feedback errors indicates that at least one bit of the second set of bits indicates a negative acknowledgement message for a first subset of the first set of bits, wherein one of the first subset of the first set of bits indicates an acknowledgement message for a respective downlink shared channel occasion.

30. A method for wireless communications at a network entity, comprising:
transmitting control signaling enabling feedback codebook bundling and indicating a bundling value;
receiving a feedback message based at least in part on transmitting the control signaling, wherein a first set of bits of a codebook corresponding to a plurality of downlink shared channel occasions is bundled into a second set of bits, each bit of the second set of bits corresponding to a respective subset of the first set of bits, wherein a quantity of bits of each subset of the first set of bits is based at least in part on the bundling value; and
decoding the feedback message according to the codebook and based at least in part on the bundling value.

* * * * *